US011968748B2

(12) United States Patent
Lindheimer et al.

(10) Patent No.: US 11,968,748 B2
(45) Date of Patent: Apr. 23, 2024

(54) SIGNALING OF RADIO CAPABILITY INFORMATION BETWEEN A RADIO NODE AND AN ACCESS AND MOBILITY MANAGEMENT FUNCTION AMF NODE

(71) Applicant: Telefonaktiebolaget LM Ericsson (publ), Stockholm (SE)

(72) Inventors: Christofer Lindheimer, Vadstena (SE); Paul Schliwa-Bertling, Ljungsbro (SE); Mikael Wass, Sätila (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 434 days.

(21) Appl. No.: 17/294,834

(22) PCT Filed: Oct. 31, 2019

(86) PCT No.: PCT/SE2019/051101
§ 371 (c)(1),
(2) Date: May 18, 2021

(87) PCT Pub. No.: WO2020/106200
PCT Pub. Date: May 28, 2020

(65) Prior Publication Data
US 2022/0014902 A1 Jan. 13, 2022

Related U.S. Application Data

(60) Provisional application No. 62/769,684, filed on Nov. 20, 2018.

(51) Int. Cl.
*H04W 8/24* (2009.01)

(52) U.S. Cl.
CPC ................................. *H04W 8/24* (2013.01)

(58) Field of Classification Search
CPC ........................................................ H04W 8/24
(Continued)

(56) References Cited

U.S. PATENT DOCUMENTS

2010/0330959 A1* 12/2010 Mildh ...................... H04W 8/08
455/410
2020/0260264 A1* 8/2020 Hapsari ................ H04W 88/06

OTHER PUBLICATIONS

3GPP, "3rd Generation Partnership Project; Technical Specification Group Radio Access Network; NR; User Equipment (UE) radio access capabilities (Release 15)", 3GPP TS 38.306 V15.3.0, Sep. 2018, 1-31.

(Continued)

*Primary Examiner* — Obaidul Huq
(74) *Attorney, Agent, or Firm* — Weisberg I.P. Law, P.A.

(57) ABSTRACT

A method performed by a network node, for handling User Equipment, UE, capabilities of a UE in a wireless communications network is provided. The network node sends (501) to the AMF node (130), a first indication indicating whether or not the network node (110) has capabilities to store UE capabilities associated with the UE capability ID. The network node receives (502) from an AMF node, a second indication indicating whether or not UE capabilities associated with a capability identity of the UE, UE capability ID, are UE available in the AMF node. The network node decides (503) whether explicit UE capabilities associated with the UE capability ID shall be retrieved from the UE or the AMF node based on the received first and second indication.

16 Claims, 17 Drawing Sheets

Method in the network node 110

(58) Field of Classification Search
USPC .................................................. 370/310, 328
See application file for complete search history.

(56) References Cited

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 15)", 3GPP TS 24.301 V15.4.0, Sep. 2018, 1-530.

3GPP, "3rd Generation Partnership Project; Technical Specification Group Core Network and Terminals; Non-Access-Stratum (NAS) protocol for 5G System (5GS); Stage 3 (Release 15)", 3GPP TSs 24.501 V15.1.0, Sep. 2018, 1-398.

3GPP, "3rd Generation Partnership Project; Technical Specification Group Radio Access Network; Evolved Universal Terrestrial Radio Access Network (E-Utran); S1 Application Protocol (S1AP) (Release 15)", 3GPP TS 36.413 V15.3.0, Sep. 2018, 1-383.

3GPP, "3rd Generation Partnership Project; Technical Specification Group Radio Access Network; NG-RAN; NG Application Protocol (NGAP) (Release 15)", 3GPP TS 38.413 V15.1.0, Sep. 2018, 1-295.

3GPP, "3rd Generation Partnership Project; Technical Specification Group Radio Access Network; NR; Radio Resource Control (RRC) protocol specification (Release 15)", 3GPP TS 38.331 V15.3.0, Sep. 2018, 1-445.

3GPP, "3rd Generation Partnership Project; Technical Specification Group Services and System Aspects; Procedures for the 5G System; Stage 2 (Release 15)", 3GPP TS 23.502 V15.3.0, Sep. 2018, 1-330.

3GPP, "3rd Generation Partnership Project; Technical Specification Group Services and System Aspects; Security architecture and procedures for 5G system (Release 15)", 3GPP TS 33.501 V15.2.0, Sep. 2018, 1-175.

3GPP, "3rd Generation Partnership Project; Technical Specification Group Services and System Aspects; Study on optimisations of UE radio capability signalling (Release 16)", 3GPP TR 23.743 V0.3.0, Oct. 2018, 1-43.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Ericsson, "Solution#7—further updates", SA WG2 Meeting #S2-129BIS, S2-1811904 (revision of S2-18xxxx), West Palm Beach, USA, Nov. 16-30, 2018, 1-5.

Huawei, et al., "Key aspects and signalling procedure for UE capability ID report", 3GPP TSG-RAN WG2#104, R2-1817676, Spokane, USA, Nov. 12-16, 2018, 1-4.

Nokia, et al., "New SID: Study on optimisations on UE radio capability signalling", TSG SA Meeting #SP-80, SP-180599, La Jolla, California, USA, Jun. 13-5, 2018, 1-4.

Vivo, "Update Key Issue #2 and Solution on how to collect the mapping of the UE capability ID and US radio capabilities", SA WG2 Meeting #128-bis, S2-188641, Sophia Antipolis, France, Aug. 20-24, 2018, 1-4.

* cited by examiner

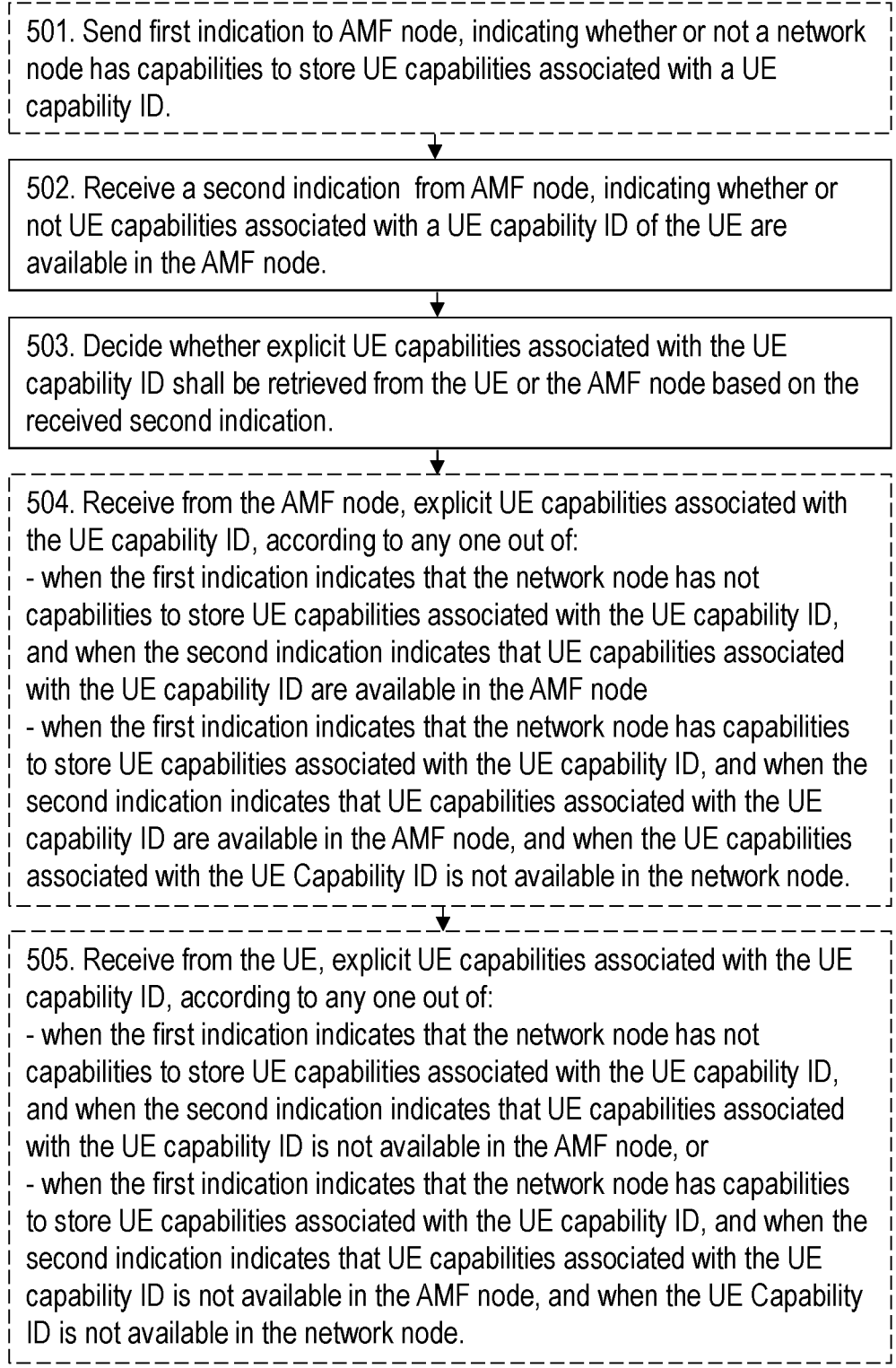
Fig. 5 Method in the network node 110

601. Receive from a UE, a capability identity of the UE, UE capability ID.

602. Receive from a network node, a first indication indicating whether or not the network node has capabilities to store UE capabilities associated with the UE capability ID.

603. Check whether or not UE capabilities associated with the UE capability ID, are available in the AMF node 604. Send to a network node serving the UE, a second indication indicating whether or not UE capabilities associated with a capability identity of the UE, UE capability ID, are available in the AMF node, according to the checking.

605. Send to the network node, explicit UE capabilities associated with the UE capability ID, according to any one out of:
- when the first indication indicates that the network node has not capabilities to store UE capabilities associated with the UE capability ID, and when the second indication indicates that UE capabilities associated with the UE capability ID are available in the AMF node, or
- when the first indication indicates that the network node has capabilities to store UE capabilities associated with the UE capability ID, and when the second indication indicates that UE capabilities associated with the UE capability ID are available in the AMF node, and when the UE capabilities associated with the UE Capability ID is not available in the network node.

606. Send to the network node, the UE capability ID and not explicit UE capabilities associated with the UE capability ID, when the first indication indicates that the network node has capabilities to store UE capabilities associated with the UE capability ID.

607. Receive from the network node, UE capabilities associated with the UE capability ID, when the first indication indicates that the network node has not capabilities to store UE capabilities associated with the UE capability ID, and when the second indication indicates that UE capabilities associated with the UE capability ID are not available in the AMF node.

Fig. 6  Method in the AMF node 130

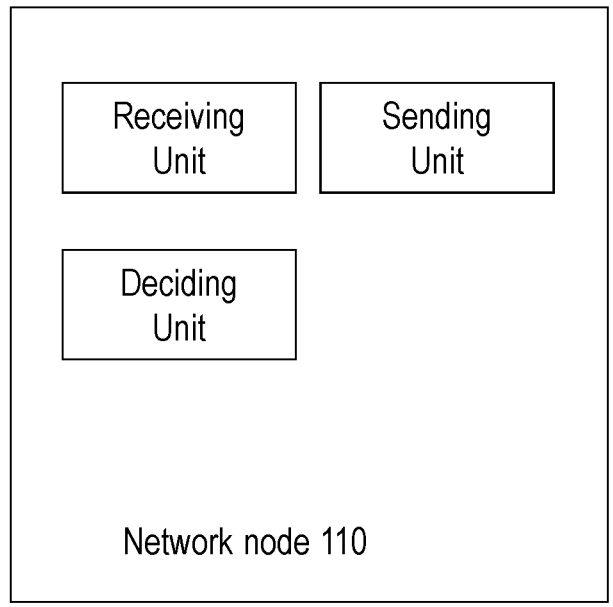
Fig. 11a
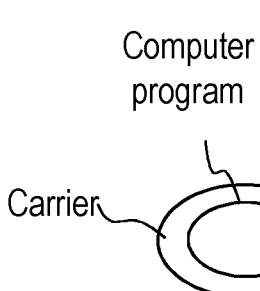
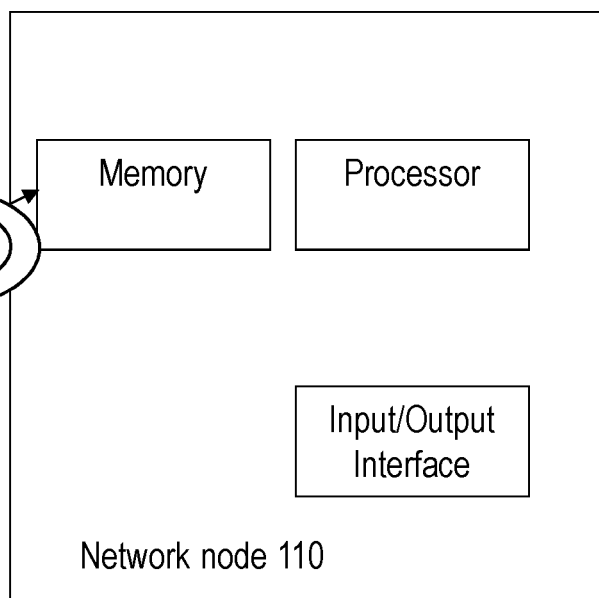
Fig. 11b

Fig. 12a
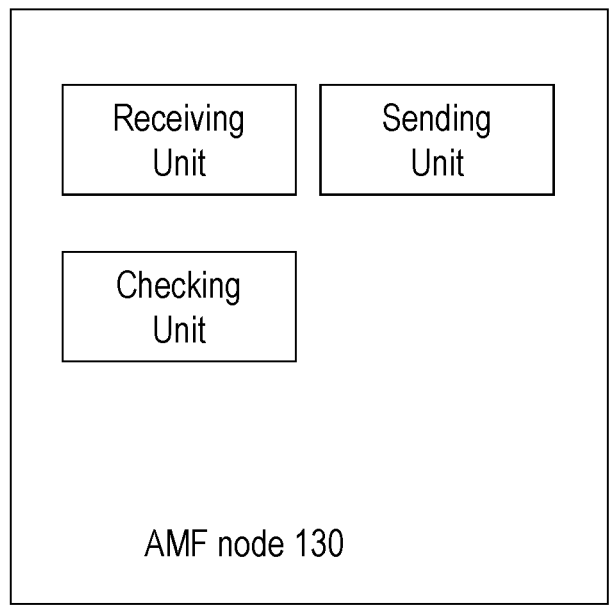
Fig. 12b
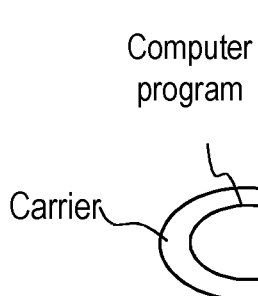 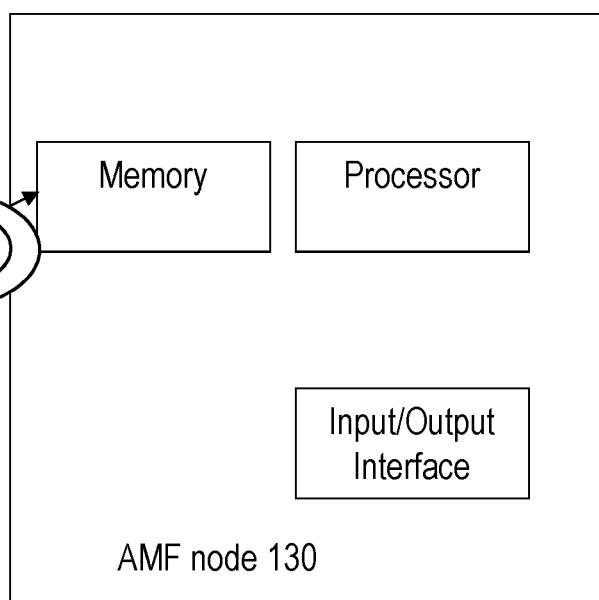

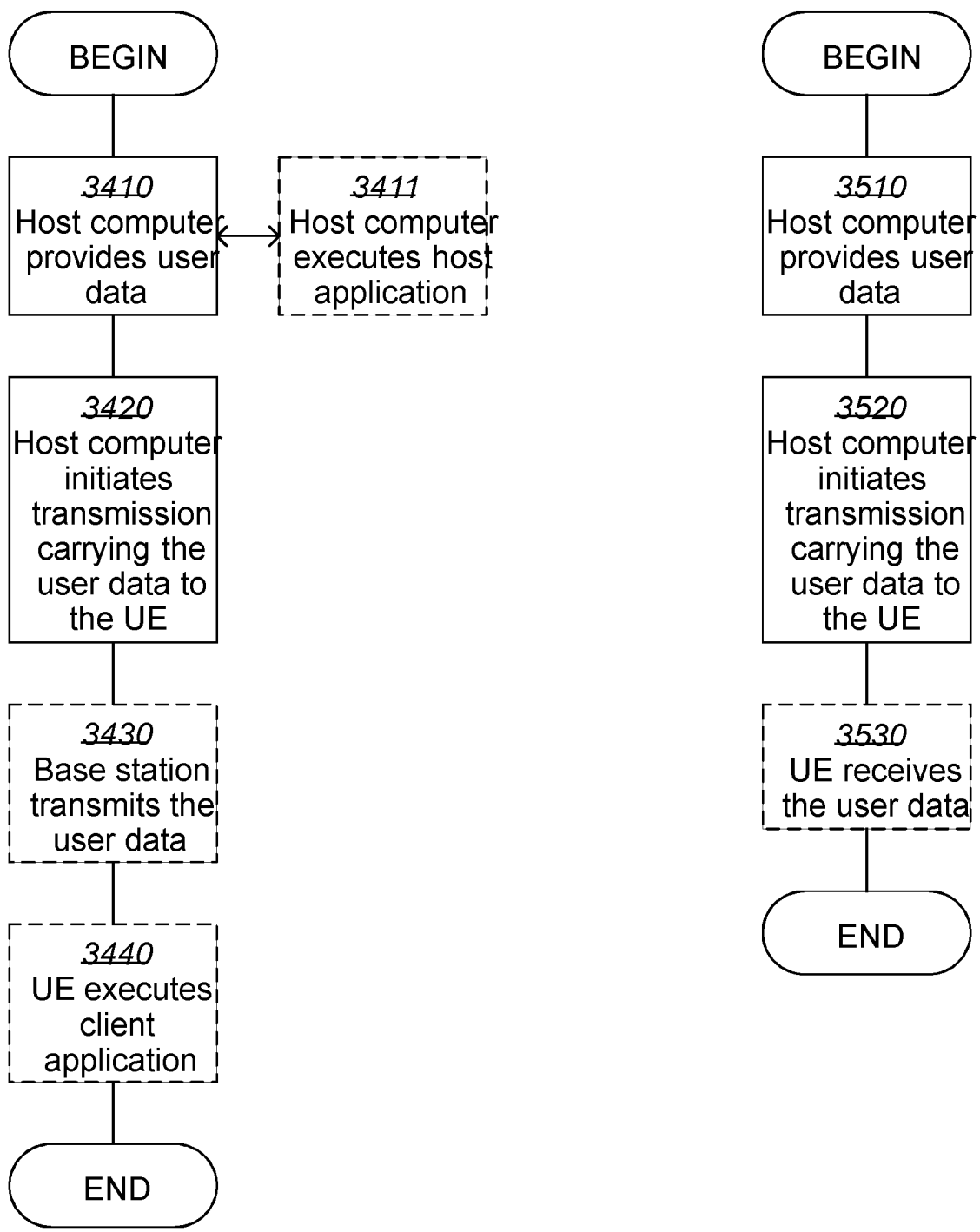

SIGNALING OF RADIO CAPABILITY INFORMATION BETWEEN A RADIO NODE AND AN ACCESS AND MOBILITY MANAGEMENT FUNCTION AMF NODE

TECHNICAL FIELD

Embodiments herein relate to a network node, an Access and Mobility management Function (AMF) node and methods therein. In particular, they relate to for handling User Equipment, UE, capabilities of a UE in a wireless communications network.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as New Generation (NG) and 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

A user equipment (UE) in communications network typically need to inform about its communication capabilities. The purpose of this is to allow peer nodes as well as network nodes, to acquire information about, e.g., what features and functionalities that a UE support. In particular for 3GPP, UE Radio Capabilities are signaled from the UE to let the radio network know what features and what frequencies a certain UE is capable of, such that the network knows how to best serve a certain UE. However, adding more and more features and supporting more and more frequencies to the standard have resulted in that UE Radio Capabilities specified by 3GPP are increasing in size, making it expensive in terms of network resource usage when they need to be transferred between relevant network entities, e.g. between AMF and NG-RAN. 3GPP is studying potential optimizations in that area. One approach that is being mentioned in 3GPP study objective is to 3GPP SP-180599:

Define an efficient representation of the UE Radio Capabilities, e.g. a UE capability identity that represents the actual UE Radio Capabilities (e.g. existing parameter such as International Mobile Equipment Identity and Software Version Number (IMEISV), an abstracted representation of the UE capabilities, new parameters, or combination of them), scope (e.g. globally unique, unique per-PLMN, etc.) and the entity (e.g. operator, device manufacturer, standards body incl.3GPP, industry fora like GSM Association (GSMA)) that performs the mapping from of a particular identity to a set of UE radio capabilities.

During the course of this study, several different solutions have been proposed, these solutions however, do not address solutions for how the signaling between the AMF and the NG-RAN node, such as gNB, ng-eNB, should look.

SUMMARY

An object of embodiments herein is to improve the performance of a wireless communications network using handover.

According to an aspect of embodiments herein, the object is achieved by a method performed by a network node, for handling User Equipment, UE, capabilities of a UE in a wireless communications network. The network node receives from an AMF node, a second indication indicating whether or not UE capabilities associated with a capability identity of the UE, UE capability ID, are available in the AMF node. The network node decides whether explicit UE capabilities associated with the UE capability ID shall be retrieved from the UE or the AMF node based on the received second indication.

According to another aspect of embodiments herein, the object is achieved by a method performed by an AMF node for handling User Equipment, UE, capabilities of a UE in a wireless communications network. The AMF node receives from a UE, a capability identity of the UE (UE capability ID), The AMF node checks whether or not UE capabilities associated with the UE capability ID, are available in the AMF node. The AMF node sends a second indication to a network node serving the UE. The second indication indicates whether or not UE capabilities associated with the UE capability ID are available in the AMF node, according to the checking.

According to another aspect of embodiments herein, the object is achieved by a network node for handling User Equipment, UE, capabilities of a UE in a wireless communications network, the network node being configured to:

Receive from an AMF node, a second indication adapted to indicate whether or not UE capabilities associated with a capability identity of the UE, UE capability ID, are available in the AMF node, and decide whether explicit UE capabilities associated with the UE capability ID shall be retrieved from the UE or the AMF node based on the received second indication, which UE capabilities.

According to another aspect of embodiments herein, the object is achieved by an AMF node for handling User Equipment, UE, capabilities of a UE in a wireless communications network. The AMF node being configured to:

Receive from a UE, a capability identity of the UE, UE capability ID, check whether or not UE capabilities associated with the UE capability ID, are available in the AMF node, and send to a network node serving the UE, a second indication adapted to indicate whether or not UE capabilities associated with the UE capability ID, are available in the AMF node, according to the checking.

BRIEF DESCRIPTION OF THE DRAWINGS

Examples of embodiments herein are described in more detail with reference to attached drawings in which:

FIG. 5 is a flowchart depicting embodiments of a method in a network node.

FIG. 6 is a flowchart depicting embodiments of a method in an AMF node.

FIG. 11 a and b are schematic block diagrams illustrating an embodiment of a network node.

FIG. 12 a and b are schematic block diagrams illustrating an embodiment of an AMF node.

FIGS. 15-18 are flowcharts illustrating methods implemented in a communication system including a host computer, a base station and a user equipment.

DETAILED DESCRIPTION

Figure 1:
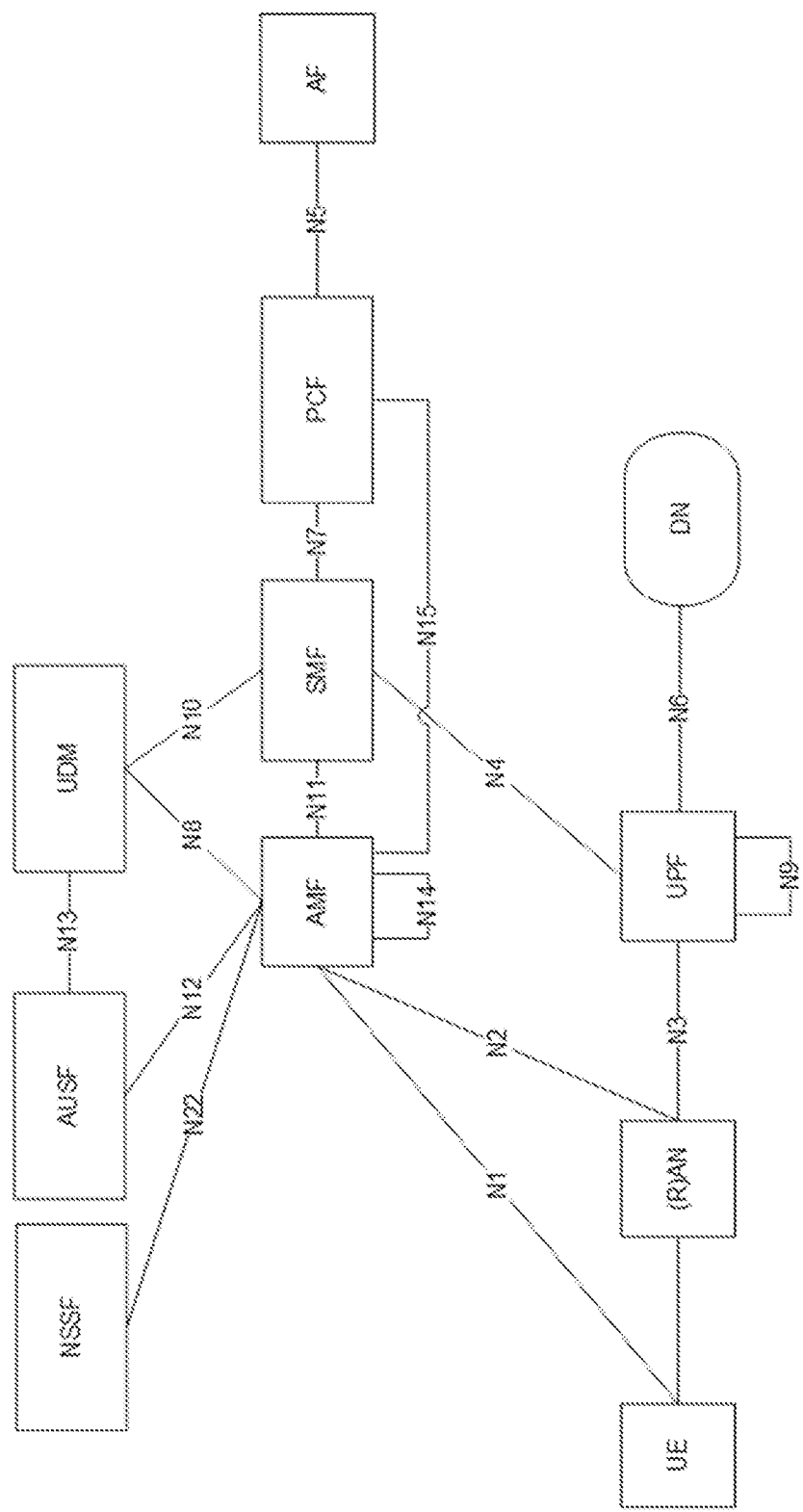
FIG. 1 is a schematic block diagram illustrating prior art.

As a part of developing embodiments herein the inventors identified a problem comprising.

Existing signaling flows, e.g. registration procedure in 3GPP TS 23.502v15.3.0 does not provide means to reduce the number of occurrences where UE Radio Capability Information is transferred between NG-RAN and AMF.

An object of embodiments herein is to improve the performance of a wireless communications network.

Embodiments herein relate generally to wireless communication techniques. In particular, they relate to means and methods for managing UE capability information in network nodes and in the UE.

Embodiments herein provide procedures and logic reducing the need for transferring UE Radio Capability Information between a network node 110, also referred to herein as NG-RAN, and an AMF node 130, also referred to herein as AMF. It shall be noted that even if example embodiments herein are using NG-RAN and AMF, hence based on 3GPP 5GS architecture, see 3GPP TS 23.501, this is only one example of possible applications. An equally feasible application would be to implement solutions described herein in a wireless system pursuant to 3GPP E-UTRA specifications and protocols for signaling between an eNB and an MME, e.g., as described in 3GPP TS 36.413, or between a UE and an MME, as described in 3GPP TS 24.301.

It is herein described embodiments of procedures and logic reducing the need for transferring UE Radio Capability Information between NG-RAN such as the network node 110 and the AMF node 130. Embodiments herein relate to ongoing SI: "Optimizations on UE radio capability signaling", in which complex and sizeable UE radio capability information is represented by a Capability ID.

Embodiments herein comprise a method for how to optimize transmission of capability information over the NG interface, by allowing info exchange on if there is Capability ID mapping storage support in NG-RAN nodes such as the network node 110 and if capability info is available in AMF such as the AMF node 130. If NG-RAN stores mapping from the Capability ID, then AMF may, instead of sending the UE radio capability information in full, simply transfer the Capability ID over NG, and the NG-RAN would know how to translate.

The following embodiments description however, are applicable for communication between the UE 120, the network node 110 e.g. an NG-RAN node such as a gNB, and the AMF node 130 also referred to as an AMF, as further described in 3GPP TS 24.501 (UE-AMF), 38.413 (gNB-AMF) and 38.331 (UE-gNB).

In some aspects of embodiments herein, a new indicator is introduced for allowing the AMF node 130 to indicate to the network node 110, whether UE Radio Capabilities associated with a UE Capability ID is stored or available in the AMF. This indication from AMF is introduced on an interface knows as NG Application Protocol (NGAP) interface and as described and specified in 3GPP TS 38.413. Such an indication from the AMF would allow a gNB node to either get information of UE Radio Capabilities from the AMF. Alternatively, it would be possible to acquire such information from the UE directly.

In another aspect of embodiments herein, a new indicator is introduced for allowing the network node 110, such as the gNB to indicate to the AMF node 130 if the network node 110 has means to store UE Radio Capability information associated with a capability ID in the network node 110. This indication from the network node 110 may be introduced on the interface known as the NGAP interface and is described and specified in 3GPP TS 38.413.

In yet another aspect of embodiments herein, a procedure for UE Radio Capability information retrieval from the AMF node 130 is introduced and applicable for signaling over the NGAP interface between the network node 110 such as a gNB and the AMF node 130. The new procedure allows that NG-RAN can retrieve UE Radio Capability information from the AMF.

Embodiments herein will now be described using examples from the network node 110 also referred to as NG-RAN node and from the AMF node 130 also referred to as AMF in the examples below.

FIG. 1 illustrates an example of a 5G system architecture, including Nodes (e.g., AMF, UE, (R)AN) and interface names.

The signaling connection over N1 is used to enable Non-Access-Stratum (NAS) signaling exchange between the UE such as the UE 120 and the AMF such as the AMF node 130 (core network). It is realized through transparent signaling over both the interface between the RAN node and the UE and the interface between the RAN node and the AMF. In the figure, the latter is referred to as N2, but is also known as NG-interface. The interface between the RAN node and the UE, i.e., the air interface is commonly known as the Uu interface. The signaling protocols for the NG (N2) interface is the NGAP signaling protocol and the signaling protocol for the air interface is the RRC signaling protocol.

One aspect of communication is that the UE such as the UE 120 should signal its capabilities. Typically different UE's have different capabilities when it comes to features and functionality that the UE supports and it may be possible to operate different UEs on different frequencies. To this, the UE is signaling its radio capabilities to the gNB such as the network node 110 and these capabilities can also be stored together with other UE information in the AMF, for UE's that are connected or registered to a network.

The UE capabilities specified for NR are included in 3GPP TS 38.306 and they are typically signaled between the UE and the gNB using RRC signaling.

Figure 2:
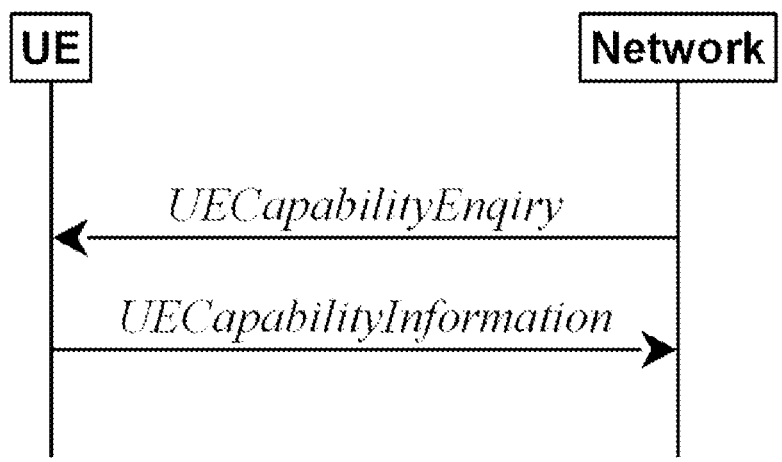
FIG. 2 is a schematic sequence diagram illustrating prior art.

An example procedure for signaling these capabilities is called UE Capability Transfer and is illustrated in FIG. 2; specified in 3GPP TS 38.331.

It is a network node such as the network node 110, typically the NG-RAN node (gNB, or ng-eNB) that initiates the procedure to a UE 120 that already got a signalling connection. The network node 110 detects if it needs additional capability information based on, for example if it is possible to retrieve from any other node, such as the AMF node 130, or not. In situations when the network node 110 detects that additional input from the UE 120 is needed, it will send a UCCapabilityEnquiry to the UE 120.

The UE 120 shall then respond with a UECapabilityInformation message including requested capability information. Typically, the Enquiry-message may include details on what information that is needed by network node 110.

If the network node 110 gets additional information related to UE radio capabilities it may forward this information for storage in the AMF node 130. This may be beneficial for later retrieval for example when information is needed for the same UE 120. Then, it may not be necessary to request information from the UE 120 again.

The procedure used when the network node 110 updates the AMF for storing new or additional capability information is described as UE Radio Capability Management Procedures and described in 3GPP TS 38.413. The procedure uses signalling that is associated with a specific UE.

Figure 3:
FIG. 3 is a schematic sequence diagram illustrating prior art.

The network node 110 node controlling a UE-associated logical NG connection initiates the procedure by sending a UE RADIO CAPABILITY INFO INDICATION message to the AMF including the UE radio capability information, see FIG. 3. Typically this is capability information that the UE 120 has sent to the network node 110 in the enquiry-information procedure described above.

The UE RADIO CAPABILITY INFO INDICATION message may also include paging specific UE radio capability information within the UE Radio Capability for Paging IE.

The UE radio capability information received by the AMF node 130 shall e.g. replace any previously stored corresponding UE radio capability information in the AMF for the UE. Typically, this may be the case if a UE would signal a change of UE capabilities.

As the amount of capability information increases, means are studied on how to address that a UE may more or less frequently send large amounts of capability information to the network, using the methods described above. One way that is being further investigated is to associate the UE capability information structure with a "UE capability ID" or "model identifier". Having an "ID" corresponding to a large set of capabilities, if it is known what the ID means, then it would be possible to get to solutions where it is only necessary to signal an ID and then, from the ID, use a mapping table to figure out what capabilities that apply (that correspond to a certain ID) Such an ID may be used both over the air interface as well as over the interface between the gNB and the AMF, in both directions.

Different types of ID's may be used, for example ID may be UE vendor and UE type-specific, or the ID may be assigned by the network. Other types of ID's may also apply. Embodiments herein are equally applicable irrespective of how the ID is allocated.

Such UE Capability ID's is used in embodiments herein resulting in that the signaling between the different nodes is simplified.

Figure 4:
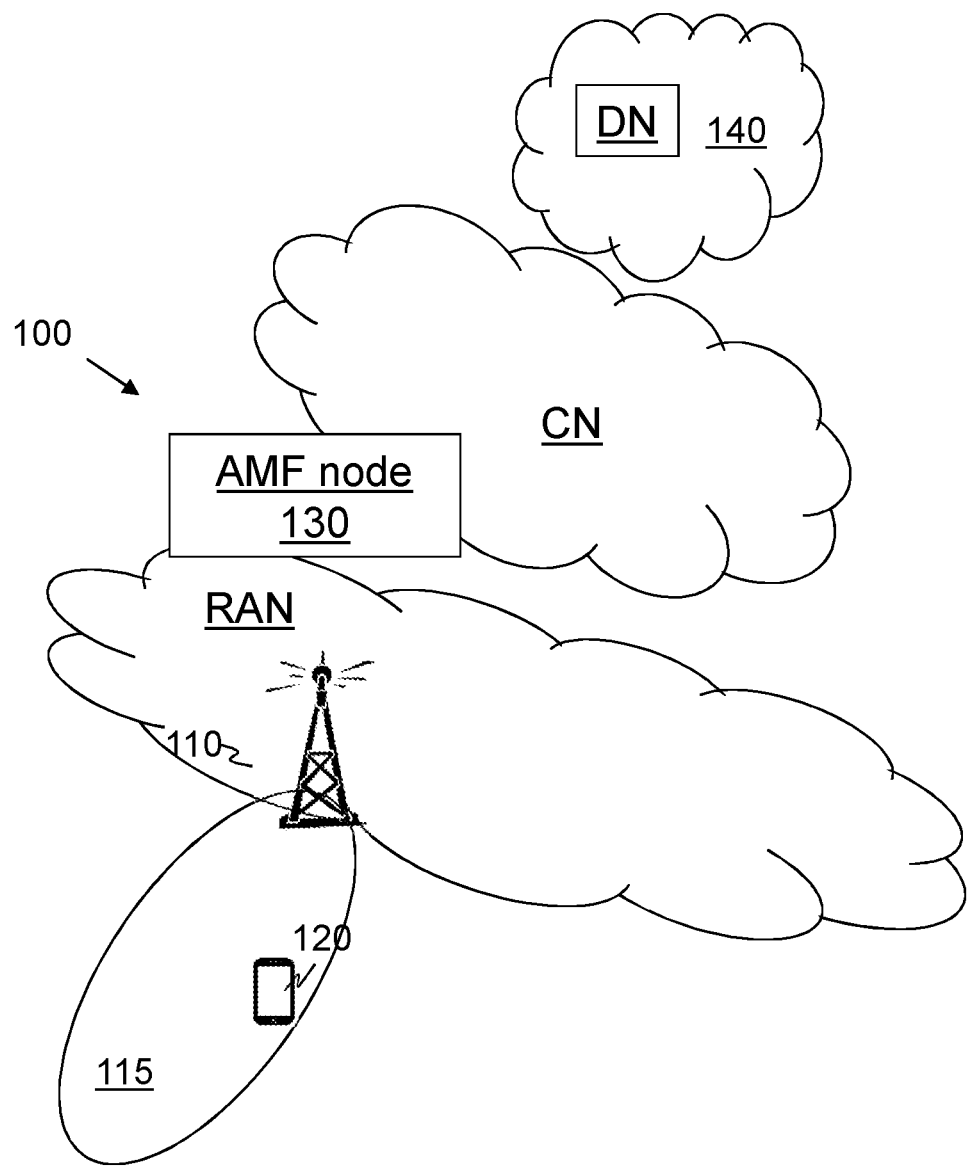
FIG. 4 is a schematic block diagram illustrating embodiments of a wireless communications network.

Embodiments herein relate to wireless communication networks in general. FIG. 4 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a network node 110, also referred to as the NG-RAN node. The network network node 110 provides radio coverage over a geographical area, a service area referred to as a cell 115, which may also be referred to as a beam or a beam group of a first radio access technology (RAT), such as 5G, LTE, W-Fi or similar. The network node 110 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The network node 110 may be referred to as serving radio access nodes and communicates with a UE with Downlink (DL) transmissions to the UE and Uplink (UL) transmissions from the UE.

A number of UEs operate in the wireless communication network 100, such as the UE 120. The UE 120 may be a mobile station, a non-access point (non-AP) STA, a STA, a user equipment and/or a wireless terminals, that communicate via one or more network nodes such as the network node 110, in a RAN to one or more core networks (CN), e.g. comprising CN nodes such as an Access and Mobility management Function (AMF) node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by network nodes such as the first network node 111, and the second network node 112. As an alternative, a Distributed Node (DN) and functionality, e.g. comprised in a cloud 140 as shown in FIG. 4, may be used for performing or partly performing the methods.

FIG. 5 shows an example method performed by the network node 110. The method is for handling UE capabilities of the UE 120 in a wireless communications network 100. It should be noted that the wording "UE capabilities" when used herein also is referred to as "UE Radio Capabilities" and these wording are used interchangeable herein.

As a summary of embodiments herein, some of the method actions are described below. Optional method actions are marked with dashed boxes in FIG. 5. These method actions comprise one or more of the following actions, which actions may be taken in any suitable order:

Action 501.

In this optional action, the network node 110 may send a first indication to the AMF node 130. The first indication indicates whether or not the network node 110 has capabilities to store UE capabilities associated with the UE capability ID. The AMF node 130 may use this first indication to configure the way in which any stored capabilities are transferred to the network node 110. If the first indication reveals that the network node 110 has capabilities to store UE capabilities associated with a capability ID, the AMF node 130 may send only the capability ID in its first transmission of capability information. If on the other hand, the first indication reveals that the network node 110 has no such capability to capability ID mapping functionality, then there is no point in sending only a capability ID from the AMF 130, as the network node 110 would not be able to translate this to the needed capability information.

Action 502.

The network node 110 receives a second indication from the AMF node 130. The second indication indicates whether or not UE capabilities associated with a capability identity of the UE 120 (UE capability ID) are available in the AMF node 130. This second indication will be used to later on be able to decide whether explicit UE capabilities associated with the UE capability ID shall be retrieved from the UE 120 or the AMF node 130. The received second indication may in some embodiments comprise only the capability ID. For example, only sending the capability ID from the AMF node 130 would indicate to the network node 110 that capability information is available in the AMF node 130.

Action 503.

The network node 110 then decides whether explicit UE capabilities associated with the UE capability ID shall be retrieved from the UE 120 or the AMF node 130 based on the received second indication. The UE capabilities when retrieved may e.g. be used for deciding how to serve the UE 120 in a data communication between the network node 110 and the UE 120. The network node 110 would then configure communication with the UE 120 that is supported by the UE 120, e.g. Bandwidths, frequencies and MIMO configurations.

The deciding whether explicit UE capabilities associated with the UE capability ID shall be retrieved from the UE 120 or the AMF node 130 may further is based on the sent first indication.

Action 504.

In some embodiments, the network node 110 receives explicit UE capabilities from the AMF node 130. The explicit UE capabilities are associated with the UE capability ID according to any one out of:

When the first indication indicates that the network node 110 has not capabilities to store UE capabilities associated with the UE capability ID, and when the second indication indicates that UE capabilities associated with the UE capability ID are available in the AMF node 130, when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID is not available in the network node 110.

This is an advantage since it would prevent unnecessary transmission of capability information from the AMF node 130 and it would allow that, when information is not available in the network node 110, such information received from AMF node 130 may be provided and stored in the network node 110 for future use.

This means that the explicit UE capabilities are associated with the UE capability ID when the first indication indicates that the network node 110 has not capabilities to store UE capabilities associated with the UE capability ID, and when the second indication indicates that UE capabilities associated with the UE capability ID are available in the AMF node 130.

This means further that the explicit UE capabilities are associated with the UE capability ID when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID are not available in the network node 110.

In some examples, when the second indication indicates that UE capabilities associated with the UE capability ID are available in the AMF node 130, and the UE capabilities associated with the UE Capability ID are not available in the network node 110, the explicit UE capabilities may be received from the AMF node 130, upon receiving a request in the AMF node 130 for the UE capabilities associated with the UE capability ID from the AMF node 130.

Action 505.

In some embodiments, the network node 110 receives explicit UE capabilities from the UE 120. The explicit UE capabilities are associated with the UE capability ID and sent in response to a UE capability Enquiry, according to any one out of:

When the first indication indicates that the network node 110 has not capabilities to store UE capabilities associated with the UE capability ID, and when the second indication indicates that UE capabilities associated with the UE capability ID is not available in the AMF node 130, or when the first indication indicates that the network node 110 has capabilities to store UE capabilities associated with the UE capability ID, and when the second indication indicates that UE capabilities associated with the UE capability ID is not available in the AMF node 130, and when the UE Capability ID is not available in the network node 110.

If there is no capability information available from the AMF node 130 nor stored in the network node 110, it may be necessary for the network node 110 to execute the procedure of sending a UE Capability Enquiry message directly to the UE 120 and retrieve capability information and, if supported, capability ID from the UE 120.

This means that the explicit UE capabilities are associated with the UE capability ID or with a UE capability Enquiry when the first indication indicates that the network node 110 has not capabilities to store UE capabilities associated with the UE capability ID, and when the second indication indicates that UE capabilities associated with the UE capability ID is not available in the AMF node 130.

This means further that the explicit UE capabilities are associated with the UE capability ID or with a UE capability Enquiry when the first indication indicates that the network node 110 has capabilities to store UE capabilities associated with the UE capability ID, and when the second indication indicates that UE capabilities associated with the UE capability ID is not available in the AMF node 130, and when the UE Capability ID is not available in the network node 110.

FIG. 6 shows an example method performed by the AMF node 130. The method is for handling UE capabilities of a UE 120 in a wireless communications network 100.

As a summary of embodiments herein, some of the method actions are described below. Optional method actions are marked with dashed boxes in FIG. 6. These method actions comprise one or more of the following actions, which actions may be taken in any suitable order:

Action 601.

The AMF node 130 receives a capability identity of the UE 120 UE capability ID from the UE 120. This is sent by the UE 120 to the AMF node 130 in order to represent the UE capabilities.

Action 602.

In some embodiments, the AMF node 130 receives a first indication from the network node 110. The first indication indicates whether or not the network node 110 has capabilities to store UE capabilities associated with the UE capability ID. This may e.g. be received when the interface between the network node 110 and the AMF 130 is set-up Action 603.

The AMF node 130 checks whether or not UE capabilities associated with the UE capability ID, are available in the AMF node 130. This is checked to be able to inform the network node 110 in a second indication of the capability ID and availability of the capability information in the AMF 130.

Action 604.

The AMF node 130 sends a second indication to the network node 110 serving the UE 120. The second indication indicates whether or not UE capabilities associated with a capability identity of the UE 120, UE capability ID, are available in the AMF node 130, according to the checking. It is an advantage for the network node 110 to know this to be able to, if information is not available in the network node 110, determine a method of capability information retrieval, from the UE 120 or from the AMF node 130.)

Action 605.

In some embodiments, the AMF node 130 sends explicit UE capabilities to the network node 110. An example scenario when the explicit UE capabilities are sent is when the network node 110 has indicated that it does not support capability ID to capability information mapping.

The explicit UE capabilities are associated with any one out of: the UE capability ID or a UE capability Enquiry, according to any one out of:

When the first indication indicates that the network node 110 has not capabilities to store UE capabilities associated with the UE capability ID, and when the second indication indicates that UE capabilities associated with the UE capability ID are available in the AMF node 130, or when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID is not available in the network node 110.

This means that the explicit UE capabilities are associated with the UE capability ID when the first indication indicates that the network node 110 has not capabilities to store UE capabilities associated with the UE capability ID, and when the second indication indicates that UE capabilities associated with the UE capability ID are available in the AMF node 130.

This means further that the explicit UE capabilities are associated with the UE capability ID when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID are not available in the network node 110.

In some embodiments, the AMF node 130 sends the explicit UE capabilities to the network node 110 directly after evaluation of first indication and local availability i.e. no second indication is needed. Or the AMF node 130 sends the second indication, which may trigger the network node to request capabilities from AMF 130 or UE 120.

In some embodiments, wherein the second indication indicates that UE capabilities associated with the UE capability ID are available in the AMF node 130, and wherein the UE capabilities associated with the UE Capability ID is not available in the network node 110, the AMF node 130 sends the explicit UE capabilities to the network node 110 as a response to a request sent to the network node 110, which request requests the UE capabilities associated with the UE capability ID from the AMF node 130, e.g. by performing a UE Radio Capability Information retrieval from AMF procedure.

Action 606.

In some embodiments, the AMF node 130 sends to the network node 110, the UE capability ID and not explicit UE capabilities associated with the UE capability ID, when the first indication indicates that the network node 110 has capabilities to store UE capabilities associated with the UE capability ID. This is sent by the AMF node 130 to the network node 110 to provide a short representation of capability information to the network node 110.

Action 607.

In some embodiments, the AMF node 130 receives from the network node 110, the UE capabilities associated with the UE capability ID, when the first indication indicates that the network node 110 has not capabilities to store UE capabilities associated with the UE capability ID, and when the second indication indicates that UE capabilities associated with the UE capability ID are not available in the AMF node 130. This is to be able to store the capability ID and the UE capabilities in the AMF node 130, in association with a UE 120 and for later use of the capability ID and thereto associated UE capabilities.

Some further advantages of implementation and/or use of the embodiments herein comprise a reduced need for transferring UE Radio Capability Information between the network node 110 and the AMF node 130 and thus reducing consumption of the network resources. This results in an improved performance of the wireless communications network 100.

Embodiments herein will now be further explained and exemplified and may be combined with embodiments as described above in any suitable way.

In one aspect of embodiments herein, the UE 120 and the network node 110 signal Capability ID instead of full capability information. The Capability ID corresponds to relevant UE Capability information. This UE capability information may be the complete instantaneous capabilities that the UE 120 has, or the Capability ID may instead be a subset of the complete instantaneous capabilities that the UE 120 has.

| Capability ID | (Explicit) Capability information |
| --- | --- |
| NN | Capability x |
|  | Capability y |
|  | Capability z |
|  | ... |
| NM | Capability X |
|  | Capability Y |
|  | Capability YY |
|  | ... |

In certain embodiments herein, the mapping between UE capabilities and the UE Capability ID may be stored in network nodes such as the AMF node and/or gNB such as the network node 110. What is important, e.g., in connection to registration, is that the capabilities in one way or another reach the gNB such as the network node 110, as it is in the gNB they should be used and interpreted. Even though they sometimes may be stored in the AMF node 130, typically the AMF node 130 doesn't need to interpret the capabilities. It simply serves as a store and forward node of the capability information.

In some embodiments, the first indicator, here called cap_availability_amf is introduced, indicating from the AMF node 130 to NG-RAN (gNB) such as the network node 110 whether UE Radio Capabilities associated with a UE Capability ID is available in the AMF, is introduced on NGAP interface. In case of absence of the UE Radio Capability Information in the NG-RAN cap_availability_amf enables NG-RAN to decide whether the UE Radio Capability Information needs to be retrieved from the UE 120 or from the AMF node 130.

In situations when the cap_availability_amf indicates that capability ID information is not available in the AMF; typically the gNB need to request the information from the UE directly.

In some other embodiments, a second indicator, here called caps_storage_supp is introduced, indicating from NG-RAN such as the network node 110 to AMF, such as the AMF node 130, whether NG-RAN stores/has the capability to store UE Radio Capabilities associated with UE Capability ID, is introduced on NGAP.

In yet another embodiment, a new procedure, UE Radio Capability Information retrieval from AMF, is introduced to NGAP enabling NG-RAN to retrieve UE Radio Capabilities from AMF such as the AMF node 130.

Embodiments herein are disclosed in the text below based on the UE registration procedure but it may be equally possible to introduce embodiments herein in connection to also other procedures.

During Registration procedure, the UE 120 includes a UE Capability ID in NAS Registration Request message as a non-cleartext Information Element (IE) ensuring that the information is encrypted when transmitted over the radio interface.

The NG-RAN such as the network node 110 includes in a NGAP INITIAL UE MESSAGE carrying the NAS Registration Request, indication of support for UE Radio Capabilities storage;

at subsequent initial context setup, the AMF such as the AMF node 130 includes UE Capability ID and a first indicator cap_availability_amf whether the associated UE Radio Capabilities are available in the AMF node 130 in the NGAP INITIAL CONTEXT SETUP REQUEST message.

If the NG-RAN such as the network node 110 did not indicate to AMF such as the AMF node 130 in the second indicator such as the caps_storage_supp that it does supports UE Radio Capabilities storage and the UE Radio Capabilities associated with the UE Capability ID received in the NAS Registration Request message are available in the AMF such as the AMF node 130, then the AMF may include the UE Radio Capabilities in the NGAP INITIAL UE CONTEXT SETUP REQUEST message.

If the NG-RAN such as the network node 110 indicated to AMF such as the AMF node 130 in the second indicator such as the caps_storage_supp that it supports UE Radio Capabilities storage, then at reception of the NGAP INITIAL CONTEXT SETUP REQUEST message, NG-RAN such as the network node 110 verifies if the UE Radio Capabilities indicated by the UE Capability ID are available in the NG-RAN;

If the NG-RAN such as the network node 110 indicated to AMF in the second indicator such as the caps_storage_supp that it supports UE Radio Capabilities storage and if the UE Radio Capabilities indicated by the UE Capability ID are neither available in the NG-RAN nor in the AMF such as the AMF node 130, NG-RAN retrieves the UE Radio Capabilities from the UE, stores it in in NG-RAN if supported and provides it to the AMF for storage in the AMF;

If the NG-RAN such as the network node 110 indicated to AMF such as the AMF node 130 in the second indicator such as the caps_storage_supp that it supports UE Radio Capabilities storage and if the UE Radio Capabilities indicated by the UE Capability ID are indicated as available in the AMF but are not available in the NG-RAN, the NG-RAN retrieves the UE Radio Capabilities from the AMF using UE Radio Capability Information retrieval from AMF and stores it in in NG-RAN;

When the AMF such as the AMF node 130 receives the UE Radio Capability for the UE Capability ID from the NG-RAN, the AMF stores this info independent of the UE Context, and this info will be used for later other UEs with the same UE Capability ID.

If available, which means that the UE Radio Capability for this UE Capability ID has been retrieved earlier, then the available info will be used for this UE. The AMF such as the AMF node 130 includes both UE Radio Capability and UE Capability ID to the NG-RAN in NGAP INITIAL CONTEXT SETUP message when required.

The UE 120 may include UE Capability ID in NAS Registration Request message as a non-cleartext IE, see 3GPP TS 33.501. NG-RAN indicates to AMF whether NG-RAN supports UE Radio Capability storage in the second indicator such as the caps_storage_supp.

Figure 7A:
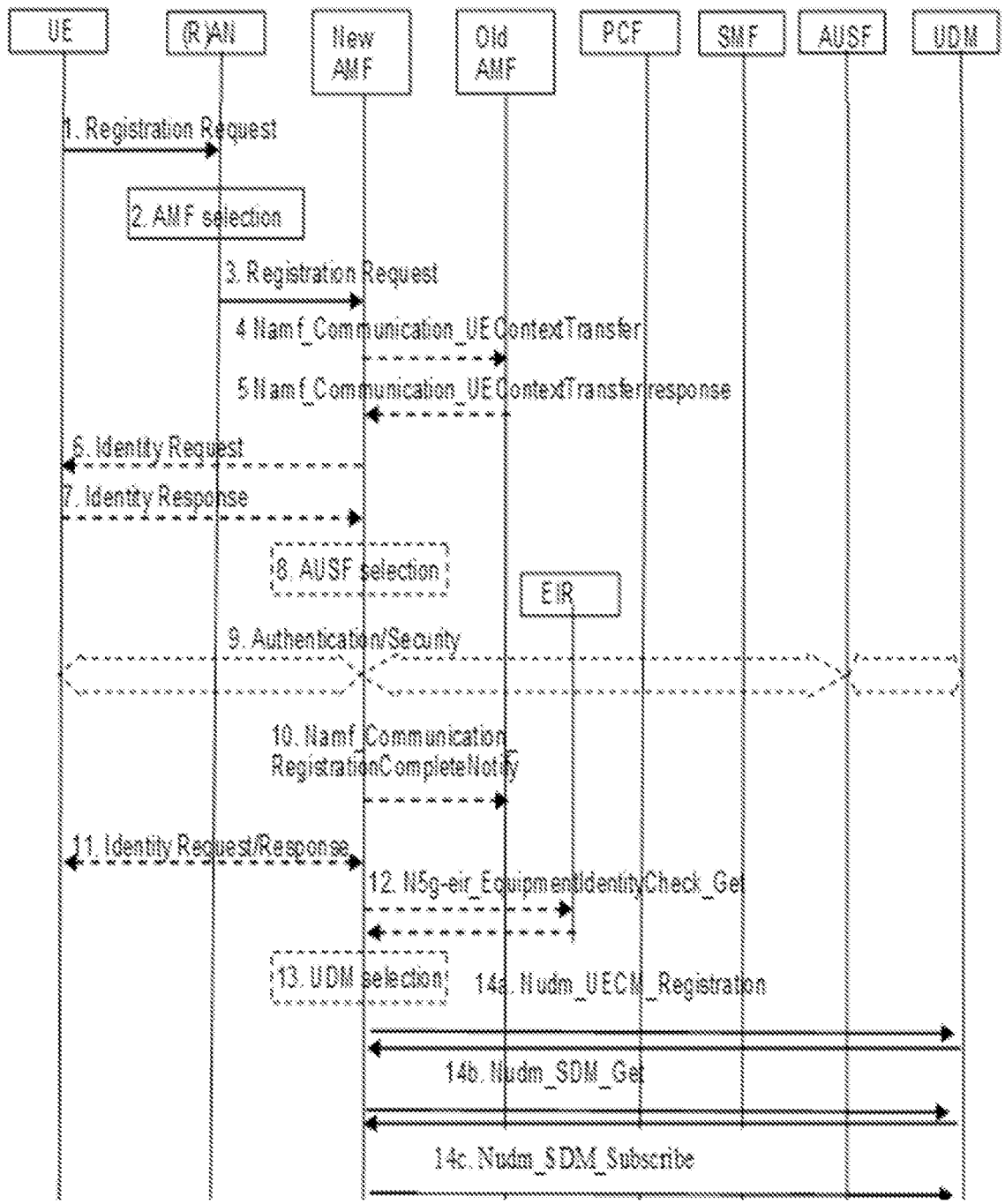
FIG. 7 a and b are schematic sequence diagrams illustrating embodiments of a method.
Figure 7B:
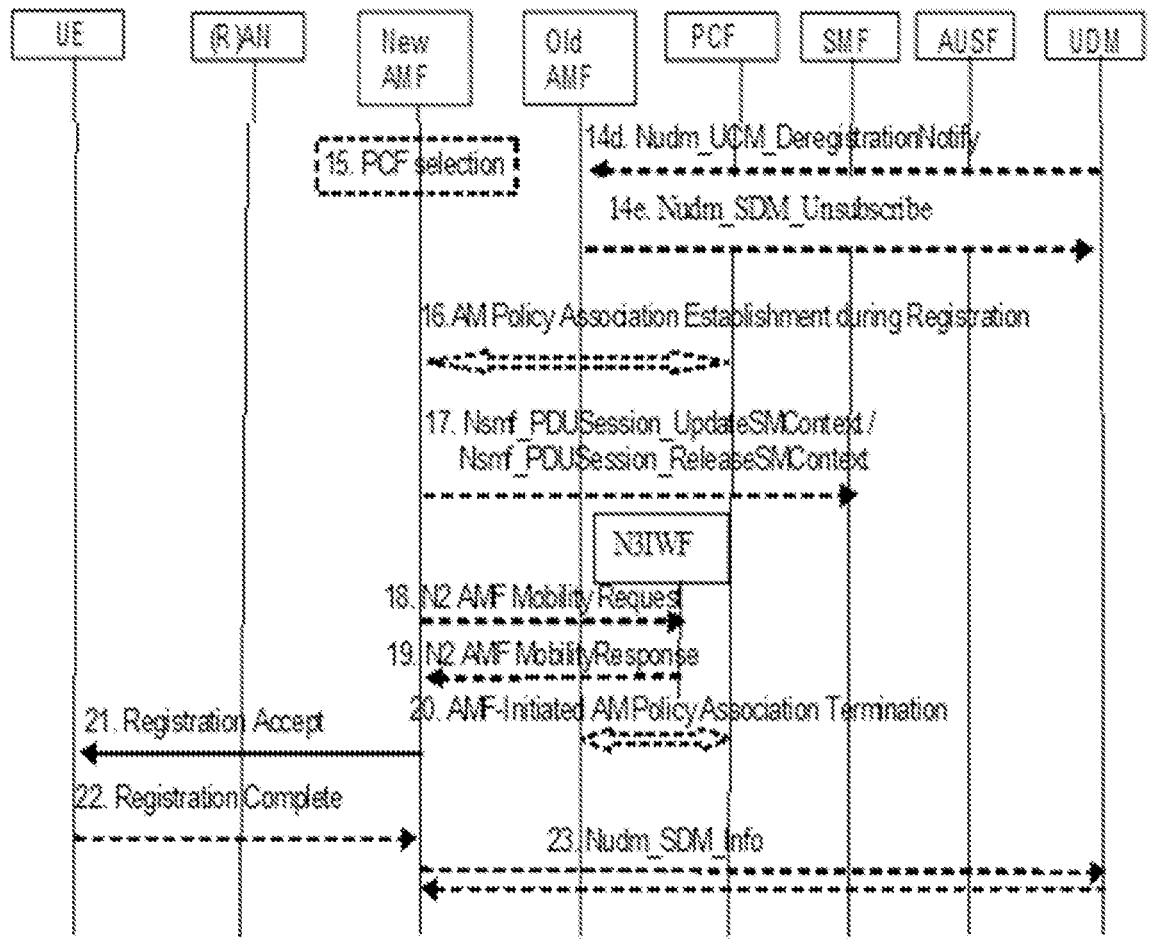

FIG. 7 *a-b* illustrate the complete registration procedure of which most steps are included for completeness, according to 3GPP TS 33.501 FIG. 4.2.2.2.2-1: Registration procedure, rather than having direct relevance to embodiments herein.

Figure 8:
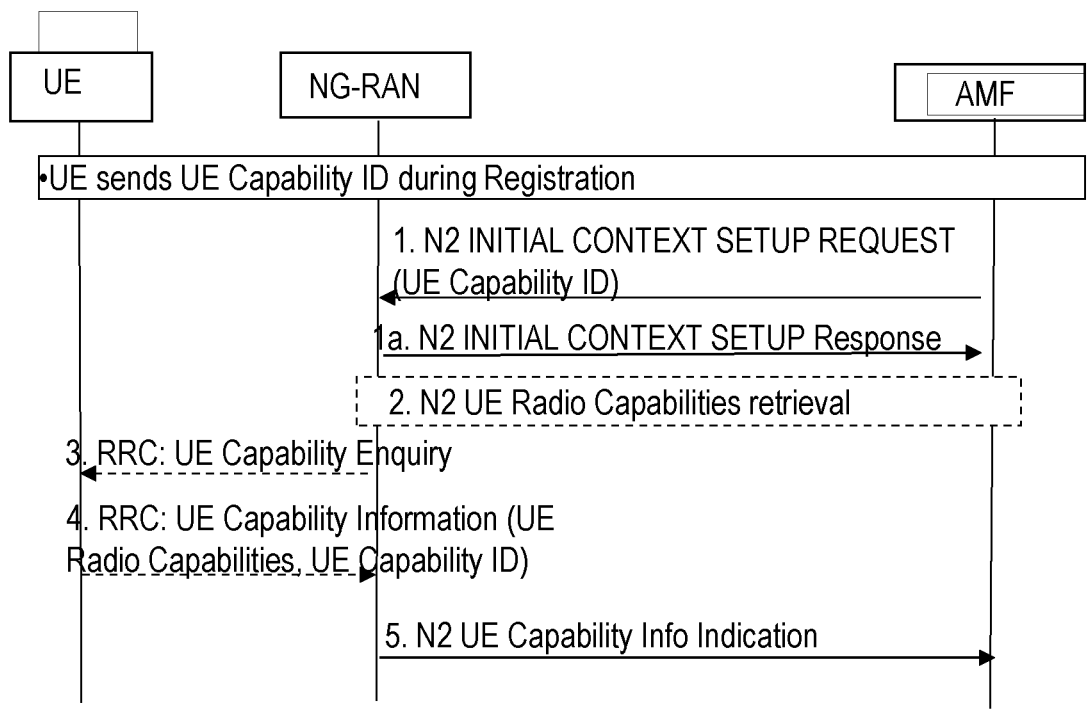
FIG. 8 is a schematic sequence diagram illustrating embodiments of a method.

FIG. 8 further describes steps illustrating what happens with the capability ID signalling according to one aspect of embodiments herein according to 3GPP TS 33.501 FIG. 6.7.3-1: AMF request RAN to retrieve UE Radio Capability e.g. comprises the following steps:

0. The UE Capability ID is stored in the AMF such as the AMF node 130 during Registration.
1. When there is a need for the AMF such as the AMF node 130 to send NGAP INITIAL CONTEXT SETUP REQUEST e.g. at Service Request, and if the NG-RAN such as the network node 110 indicated support for UE Radio Capabilities storage in the NG-RAN in the second indicator such as the caps_storage_supp, the AMF includes UE Capability ID and indicates if the UE Radio Capabilities for the UE Capability ID are available in the AMF. If the NG-RAN such as the network node 110 did not indicate in the second indicator such as the caps_storage_supp that it supports UE Radio Capabilities storage and the UE Radio Capabilities are available in the AMF such as the AMF node 130, the AMF includes the UE Radio Capability ID and the UE Radio Capabilities.
1a. NG-RAN such as the network node 110 responds with NGAP INITIAL CONTEXT SETUP RESPONSE.
2. If the UE Radio Capabilities are not available in NG-RAN such as the network node 110 and the AMF such as the AMF node 130 indicates UE Radio Capabilities availability in the first indicator such as the cap_availability_amf, the NG-RAN retrieves the UE Radio Capabilities from the AMF using UE Radio Capability Information retrieval from AMF procedure.
3. If the UE Radio Capabilities are not available in NG-RAN such as the network node 110 and not available in AMF such as the AMF node 130, the NG-RAN requests the UE 120 to upload the UE radio capability information associated with UE Capability ID.
4. The UE 120 provides the NG-RAN such as the network node 110 with its UE radio capabilities associated with the UE Capability ID sending the RRC UE Capability Information.
5. The NG-RAN such as the network node 110 sends the UE Radio Capability to the AMF such as the AMF node 130. The AMF stores the UE Radio Capability associated with the UE Capability ID.

In another aspect of embodiments herein, and as indicated in step 2 above, the gNB such as the network node 110 may follow a new procedure to acquire capability information from the AMF such as the AMF node 130.

Figure 9:
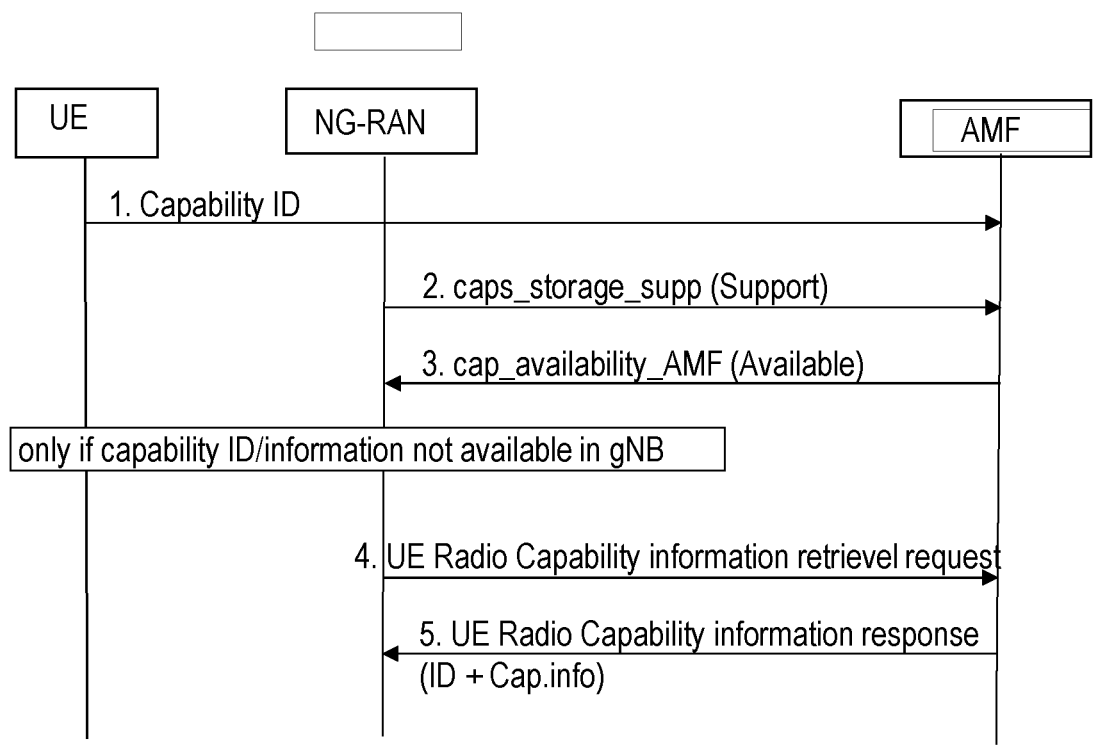
FIG. 9 is a schematic sequence diagram illustrating embodiments of a method.

The sequence diagram depicted in FIG. 9, is used to further describe the procedure. Note that steps 1-3 are not really messages but indicate only that, irrespective of message, at least the Capability ID (in step 1), the second indicator such as the caps_storage_supp (in step 2) and the first indicator such as the cap_availability_amf (in step 3) are included.

In step 1, the capability ID is transferred to the AMF such as the AMF node 130. This may for example occur as described for a UE registration procedure as described above.

In step 2, the above-described second indicator such as the caps_storage_supp indication is sent to the AMF such as the AMF node 130 to indicate that the gNB such as the network node 110 may store capability ID and capability information mapping.

In step 3, at least partially based on the second indicator such as the cap_storage_supp indication, the AMF such as the AMF node 130 will send only the capability ID that is relevant for the UE 120. In addition to this, the gNB such as the network node 110 receives information via the first indicator such as the cap_availability_amf that mapping is available in the AMF such as the AMF node 130.

After step 3, it may be detected in gNB such as the network node 110 that, even though mapping is supported, the particular capability ID is not stored in gNB. The gNB may then, as it is available in the AMF such as the AMF node 130, avoid sending a request for further information to the UE 120, but instead send a request for explicit capability information n (not only an ID) to the AMF.

In step 4, the gNB such as the network node 110 sends the request and in step 5, the AMF such as the AMF node 130 will respond with the stored information.

Embodiments herein have been described above with references to various signaling diagrams.

From a node perspective, the actions relevant in each node/UE are:

The steps in the gNB such as the network node 110 are:
1. Send a UE specific message to AMF such as the AMF node 130 including a second indicator such as the cap_storage_supp indication.
2. Receive from AMF such as the AMF node 130, a UE specific message including Capability ID and first indicator such as the cap_availability_amf indication.
3. If value of the second indicator such as the cap_storage_supp is not supported and
   a. If value of the first indicator such as the cap_availability_amf=not Available
      i. Initiate CapabilityEnquirymessage to the UE 120.
      ii. Receive CapabilityInformation from the UE 120.
      iii. UpdateCapabilityInformation to AMF such as the AMF node 130 with CapabilityInfoIndication procedure over NG.
   b. Else read explicit capability information from AMF such as the AMF node 130 included together with Capability ID and optionally the first indicator such as the cap_availability_amf-
4. Else if value of the second indicator such as the cap_storage_supp is supported and
   a. If value of the first indicator such as the cap_availability_amf=not available
      i. If Capability ID is available in gNB such as the network node 110

1. Use Capability information corresponding to Capability ID
2. Respond with CapabilityInfoIndication to AMF such as the AMF node 130
 ii. If Capability ID is not available in gNB such as the network node 110
  1. Initiate CapabilityEnquirymessage to the UE 120.
  2. Receive CapabilityInformation from the UE 120.
  3. UpdateCapabilityInformation to AMF such as the AMF node 130 with CapabilityInfoIndication procedure over NG
 b. If value of the first indicator such as the cap_availability_amf=available
  i. If Capability ID is available in gNB such as the network node 110
   1. Use Capability information corresponding to Capability ID
  ii. If Capability ID is not available in gNB such as the network node 110
   1. Initiate UE Radio Capability Information retrieval request to AMF such as the AMF node 130
   2. Receive UE Radio Capability Information Response The steps in the AMF node 130 are:
1. Receive Capability ID from the UE 120
2. Receive initial message from gNB such as the network node 110 including the second indicator such as the cap_storage_supp
3. Check if mapping is available in AMF for provided Capability ID
 a. If mapping is available in AMF such as the AMF node 130
  i. Include the first indicator such as the cap_availability_amf=available in initial signaling to gNB such as the network node 110
 b. Else
  i. Include the first indicator such as the cap_availability_amf=not available in initial signaling to gNB such as the network node 110
4. If the second indicator such as the cap_storage_supp=supported
 a. Include only capability ID in initial signaling to gNB such as the network node 110
 b. If receiving UE Radio Capability information retrieval request from gNB such as the network node 110
  i. Respond with UE Radio Capability Information Response
5. Else, if the second indicator such as the cap_storage_supp=not supported
 a. If the first indicator such as the cap_availability_amf=available
  i. Include explicit capability information in initial message to gNB such as the network node 110
 b. Else if the first indicator such as the cap_availability_amf=not available
  i. Include the first indicator such as the cap_availability_amf=not available indication to gNB such as the network node 110
  ii. Receive CapabilityInfoIndication from gNB such as the network node 110 for Capability ID Embodiments herein have been described above, with references to signaling related to a specific UE, e.g., a UE registration.

In yet another aspect of embodiments herein, it is possible setup the interface between the gNB such as the network node 110 and the AMF such as the AMF node 130 such that it always sends explicit stored capability information and capability ID already in the first information to the gNB such as the network node 110. This is exemplified above with the INITIAL CONTEXT SETUP REQUEST message.

In situations when a gNB such as the network node 110 does not include functionality to store any Capability ID to capability information mapping, this fact is not likely to change, and thus, the interface configuration between the gNB such as the network node 110 and the AMF such as the AMF node 130 (the non-UE-specific configuration) may be made such that, in case the gNB such as the network node 110 does not support Capability ID to capability information mapping storage, then the INITIAL CONTEXT SETUP REQUEST message will always include, in addition to the ID, also the explicit capability information.

If the gNB such as the network node 110 has the capability to store information related to Capability ID-to-capability information mapping, then the first message from the AMF such as the AMF node 130 to the gNB such as the network node 110 does not need to include the explicit capability information, only the ID.

The difference compared to what has been described in connection to caps_storage_supp and cap_availability_amf signaling is that this signaling is occurring per UE such as the UE 120. In this aspect of the embodiments herein however, the signaling does not need to occur per UE, as the setup of the interface determines if capability ID should be sent only, or in combination with explicit capability information.

Figure 10:
FIG. 10 is a schematic sequence diagram illustrating embodiments of a method.

This part of embodiments herein thus provides to make additions to the NG Setup procedure, see FIG. 10 depicting 3GPP FIG. 8.7.1.2-1 NG setup: successful operation.

The purpose of the NG Setup procedure is to exchange application level data needed for the NG-RAN node such as the network node 110 and the AMF such as the AMF node 130 to correctly interoperate on the NG-C interface. This procedure shall be the first NGAP procedure triggered after the TNL association has become operational. The procedure uses non-UE associated signalling.

The NG-RAN node such as the network node 110 initiates the procedure by sending an NG SETUP REQUEST message including the appropriate data to the AMF. The AMF responds with an NG SETUP RESPONSE message including the appropriate data.

As part of the appropriate data, the NG-RAN node such as the network node 110 indicates to the AMF such as the AMF node 130 that it does or it does not support storing of Capability ID-to-capability-information mapping. If it is indicated that this is not supported, subsequent signaling where the capability ID would be included would also include the explicit capability information. If it is indicated that Capability ID-To-capability-information mapping is supported, subsequent UE-specific signaling may start with only including the Capability ID when capability information is needed.

An example embodiment method performed by the network node 110 comprises: Indicating to the AMF node 130 as part of appropriate data, that it does or it does not support storing of Capability ID-to-capability-information mapping, and if it is indicated that storing of Capability ID-to-capability-information mapping is not supported, subsequent signaling where the capability ID is included will also include explicit capability information, and if it is indicated that Capability ID-To-capability-information mapping is supported, subsequent UE-specific signaling will start with only including the Capability ID when capability information is needed.

The steps in the UE 120 are:
1. Send a message to the AMF such as the AMF node 130 including a UE Capability ID,
2. Upon request from gNB such as the network node 110, respond to UECapabilityEnquiry Some embodiments herein may comprise:
1. Include an indication in signaling from the gNB such as the network node 110 to the AMF such as the AMF node 130 whether storing of capability ID-to-capability information mapping is supported by gNB such as the network node 110
2. Where the above indication in 1 is included in UE-specific signaling or when
3. The above indication in 1 is included as part of setup of the NG interface.
4. Include an indication in signaling from the AMF such as the AMF node 130 to the gNB such as the network node 110 indicating whether the Capability-ID-to-capability information mapping is available in the AMF
5. Where the indication in 4 is included in UE-specific signaling
6. Where, based on the indication in 3, include or exclude explicit capability information in initial signaling from AMF such as the AMF node 130 to gNB such as the network node 110.
7. Where initial signaling according to 6 is INITIAL CONTEXT SETUP REQUEST
8. Where, if indication in 6 points to that gNB such as the network node 110 does not store Capability ID to capability information mapping, always include explicit capability information in INITIAL CONTEXT SETUP REQUEST
9. Where, if indication in 6 points to that gNB such as the network node 110 supports Capability ID to Capability information mapping, don't include explicit capability information in INITIAL CONTEXT SETUP REQUEST
10. In situations when Capability mapping is not available in the gNB such as the network node 110 and only Capability ID is signaled from the AMF such as the AMF node 130, request information from AMF via a request response procedure from the gNB to the AMF where the AMF responds with explicit information corresponding to an indicated capability ID.
11. According to 10, preceded by that AMF such as the AMF node 130 has indicated availability according to 4

FIG. 11 a and b show an example of the network node 110 comprising a receiving unit, a sending unit and a deciding unit.

FIG. 12 a and b show an example of the AMF node 130 comprising a receiving unit, a sending unit and a checking unit.

The network node 110 and AMF node 130 may comprise a respective input and output interface configured to communicate with each other, see FIG. 11 b and 12b. The input and output interface may comprise a wireless receiver (not shown) and a wireless transmitter (not shown).

The embodiments herein may be implemented through a respective processor or one or more processors, such as the processor of a processing circuitry in the network node 110 depicted in FIG. 11b and the AMF node 130 depicted in FIG. 12b, together with computer program code for performing the functions and actions of the embodiments herein. The program code mentioned above may also be provided as a computer program product, for instance in the form of a data carrier carrying computer program code for performing the embodiments herein when being loaded into the network node 110 and the AMF node 130. One such carrier may be in the form of a CD ROM disc. It is however feasible with other data carriers such as a memory stick. The computer program code may furthermore be provided as pure program code on a server and downloaded to the network node 110 and the AMF node 130.

The network node 110 and the AMF node 130 may further comprise a respective memory comprising one or more memory units. The memory comprises instructions executable by the respective processor in the network node 110 and the AMF node 130.

The memory is arranged to be used to store e.g. indications, UE capabilities associated with respective UE capability IDs, configuration information and other information, data, configurations, and applications to perform the methods herein when being executed in the network node 110 and the AMF node 130.

In some embodiments, a respective computer program comprises instructions, which when executed by the at least one processor, cause the at least one processor of the network node 110 and the AMF node 130 to perform the respective actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the, described above may refer to a combination of analog and digital circuits, and/or one or more processors configured with software and/or firmware, e.g. stored in the network node 110 and the AMF node 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-28 are described below. The following embodiments refer to FIGS. 4, 5, and 6 and FIG. 11a, b and 12a, b.

Embodiment 1. A method performed by a network node, 110 e.g. for handling User Equipment, UE, capabilities of a UE 120 in a wireless communications network 100, the method comprising any one or more out of:
  receiving 502 from an AMF node 130, a second indication indicating whether or not UE capabilities associated with a capability identity of the UE 120, UE capability ID, are available in the AMF node 130,
  deciding 503 whether explicit UE capabilities associated with the UE capability ID shall be retrieved from the UE 120 or the AMF node 130 based on the received second indication, which UE capabilities e.g. will be used for deciding how to serve the UE 120 in a data communication between the network node 110 and the UE 120.

Embodiment 2. The method according to embodiments 1, further comprising:
sending 501 to the AMF node 130, a first indication indicating whether or not the network node 110 has capabilities to store UE capabilities associated with the UE capability ID.

Embodiment 3. The method according to any of the embodiments 1-2, wherein deciding 503 whether explicit UE capabilities associated with the UE capability ID shall be retrieved from the UE 120 or the AMF node 130 further is based on the sent first indication.

Embodiment 4. The method according to any of the embodiments 1-3, further comprising:
receiving 504 from the AMF node 130, explicit UE capabilities associated with the UE capability ID, according to any one out of:
when the first indication indicates that the network node 110 has not capabilities to store UE capabilities associated with the UE capability ID, and when the second indication indicates that UE capabilities associated with the UE capability ID are available in the AMF node 130
when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID is not available in the network node 110.

Embodiment 5. The method according to embodiment 4, wherein receiving 504 from the AMF node 130, explicit UE capabilities associated with the UE capability ID, when and when the second indication indicates that UE capabilities associated with the UE capability ID are available in the AMF node 130, and when the UE capabilities associated with the UE Capability ID is not available in the network node 110 is performed upon receiving a request for the UE capabilities associated with the UE capability ID from the AMG node 130, e.g. by performing UE Radio Capability Information retrieval from AMF procedure.

Embodiment 6. The method according to any of the embodiments 1-3, further comprising:
receiving 505 from the UE 120, explicit UE capabilities associated with the UE capability ID, according to any one out of:
when the first indication indicates that the network node 110 has not capabilities to store UE capabilities associated with the UE capability ID, and when the second indication indicates that UE capabilities associated with the UE capability ID is not available in the AMF node 130, or
when the first indication indicates that the network node 110 has capabilities to store UE capabilities associated with the UE capability ID, and when the second indication indicates that UE capabilities associated with the UE capability ID is not available in the AMF node 130, and when the UE Capability ID is not available in the network node 110.

Embodiment 7. A computer program comprising instructions, which when executed by a processor, causes the processor to perform actions according to any of the embodiments 1-6.

Embodiment 8. A carrier comprising the computer program of embodiment 7, wherein the carrier is one of an electronic signal, an optical signal, an electromagnetic signal, a magnetic signal, an electric signal, a radio signal, a microwave signal, or a computer-readable storage medium.

Embodiment 9. A method performed by a AMF node 130 e.g. for handling User Equipment, UE, capabilities of a UE 120 in a wireless communications network 100, the method comprising any one or more out of:
receiving 601 from a UE 120, a capability identity of the UE 120, UE capability ID,
checking 603 whether or not UE capabilities associated with the UE capability ID, are available in the AMF node 130, and
sending 604 to a network node 110 serving the UE 120, a second indication indicating whether or not UE capabilities associated with a capability identity of the UE 120, UE capability ID, are available in the AMF node 130, according to the checking.

Embodiment 10. The method according to embodiment 9, further comprising:
receiving 602 from a network node 110, a first indication indicating whether or not the network node 110 has capabilities to store UE capabilities associated with the UE capability ID.

Embodiment 11. The method according to any of the embodiments 9-10, further comprising:
sending 605 to the network node 110, explicit UE capabilities associated with the UE capability ID, according to any one out of:
when the first indication indicates that the network node 110 has not capabilities to store UE capabilities associated with the UE capability ID, and when the second indication indicates that UE capabilities associated with the UE capability ID are available in the AMF node 130, or
when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID is not available in the network node 110.

In some embodiments, the AMF node 130 sends directly after evaluation of first indication and local availability i.e. no second indication is needed. Or the AMF sends the second indication, which may trigger the network node to request capabilities from AMF 130 or UE 120.

Embodiment 12. The method according to embodiment 11, wherein sending 605 to the network node 110, explicit UE capabilities associated with the UE capability ID, when and when the second indication indicates that UE capabilities associated with the UE capability ID are available in the AMF node 130, and when the UE capabilities associated with the UE Capability ID is not available in the network node 110 is performed as a response to a request sent to the network node 110, which request requests the UE capabilities associated with the UE capability ID from the AMG node 130, e.g. by performing a UE Radio Capability Information retrieval from AMF procedure.

Embodiment 13. The method according to any of the embodiments 9-10, further comprising:
sending 606 to the network node 110, the UE capability ID and not explicit UE capabilities associated with the UE capability ID, when the first indication indicates that the network node 110 has capabilities to store UE capabilities associated with the UE capability ID.

Embodiment 14. The method according to any of the embodiments 9-13, further comprising:
receiving 607 from the network node 110, UE capabilities associated with the UE capability ID, when the first indication indicates that the network node 110 has not capabilities to store UE capabilities associated with the UE capability ID, and when the second indication indicates that UE capabilities associated with the UE capability ID are not available in the AMF node 130.

Embodiment 15. A computer program 870 comprising instructions, which when executed by a processor 850, causes the processor 850 to perform actions according to any of the embodiments 8-13.

Embodiment 16. A carrier 880 comprising the computer program 870 of embodiment 13, wherein the carrier is one of an electronic signal, an optical signal, an electromagnetic signal, a magnetic signal, an electric signal, a radio signal, a microwave signal, or a computer-readable storage medium.

Embodiment 17. A network node 110 e.g. for handling User Equipment, UE, capabilities of a UE 120 in a wireless communications network 100, the network node 110 being configured to any one or more out of:
receive from an AMF node 130, a second indication adapted to indicate whether or not UE capabilities associated with a capability identity of the UE 120, UE capability ID, are available in the AMF node 130, e.g. by means of a receiving unit in the network node 110, and
decide whether explicit UE capabilities associated with the UE capability ID shall be retrieved from the UE 120 or the AMF node 130 based on the received second indication, which UE capabilities e.g. are adapted to be used for deciding how to serve the UE 120 in a data communication between the network node 110 and the UE 120, e.g. by means of a deciding unit in the network node 110.

Embodiment 18. The network node 110 according to embodiment 17, further being configured to:
send to the AMF node 130, a first indication adapted to indicate whether or not the network node 110 has capabilities to store UE capabilities associated with the UE capability ID, e.g. by means of a deciding unit in the network node 110.

Embodiment 19. The network node 110 according to any of the embodiments 17-18, wherein the decision whether explicit UE capabilities associated with the UE capability ID shall be retrieved from the UE 120 or the AMF node 130 further is based on the sent first indication.

Embodiment 20. The network node 110 according to any of the embodiments 17-19, further being configured to:
receive, e.g. by means of the receiving unit in the network node 110, from the AMF node 130, explicit UE capabilities associated with the UE capability ID, according to any one out of:
when the first indication indicates that the network node 110 has not capabilities to store UE capabilities associated with the UE capability ID, and when the second indication indicates that UE capabilities associated with the UE capability ID are available in the AMF node 130
when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID is not available in the network node 110.

Embodiment 21. The network node 110 according to embodiment 20, wherein the reception from the AMF node 130, explicit UE capabilities associated with the UE capability ID, and when the second indication indicates that UE capabilities associated with the UE capability ID are available in the AMF node 130, and when the UE capabilities associated with the UE Capability ID is not available in the network node 110, is adapted to be performed upon receiving a request for the UE capabilities associated with the UE capability ID from the AMG node 130, e.g. by being configured to perform UE Radio Capability Information retrieval from AMF procedure.

Embodiment 22. The network node 110 according to any of the embodiments 17-19, further being configured to:
receive, e.g. by means of the receiving unit in the network node 110, from the UE 120, explicit UE capabilities associated with any one out of: the UE capability ID, or a UE capability Enquiry according to any one out of:
when the first indication indicates that the network node 110 has not capabilities to store UE capabilities associated with the UE capability ID, and when the second indication indicates that UE capabilities associated with the UE capability ID is not available in the AMF node 130, or
when the first indication indicates that the network node 110 has capabilities to store UE capabilities associated with the UE capability ID, and when the second indication indicates that UE capabilities associated with the UE capability ID is not available in the AMF node 130, and when the UE Capability ID is not available in the network node 110.

Embodiment 23. An AMF node 130 e.g. for handling User Equipment, UE, capabilities of a UE 120 in a wireless communications network 100, the AMF node 130 being configured to any one or more out of:
receive from a UE 120, a capability identity of the UE 120, UE capability ID, e.g. by means of a receiving unit in the AMF node 130,
check whether or not UE capabilities associated with the UE capability ID, are available in the AMF node 130, e.g. by means of a checking unit in the AMF node 130, and
send to a network node 110 serving the UE 120, a second indication adapted to indicate whether or not UE capabilities associated with a capability identity of the UE 120, UE capability ID, are available in the AMF node 130, according to the checking, e.g. by means of a sending unit in the AMF node 130.

Embodiment 24. The AMF node 130 according to embodiment 23, further being configured to:
receive from a network node 110, a first indication indicating whether or not the network node 110 has capabilities to store UE capabilities associated with the UE capability ID, e.g. by means of the receiving unit in the AMF node 130.

Embodiment 25. The AMF node 130 according to any of the embodiments 23-24, further being configured to:
send, e.g. by means of the sending unit in the AMF node 130, to the network node 110, explicit UE capabilities associated with any one out of: the UE capability ID, or a UE capability Enquiry according to any one out of:
when the first indication indicates that the network node 110 has not capabilities to store UE capabilities associated with the UE capability ID, and when the second indication indicates that UE capabilities associated with the UE capability ID are available in the AMF node 130, or when the first indication indicates that the network node 110 has capabilities to store UE capabilities associated with the UE capability ID, and when the second indication indicates that UE capabilities associated with the UE capability ID are available in the AMF node 130, and when the UE capabilities associated with the UE Capability ID is not available in the network node 110.

In some embodiments, the AMF node 130 sends directly after evaluation of first indication and local availability i.e. no second indication is needed. Or the AMF sends the second indication, which may trigger the network node to request capabilities from AMF 130 or UE 120.

Embodiment 26. The AMF node 130 according to embodiment 25, wherein the sending to the network node 110, explicit UE capabilities associated with the UE capability ID, when and when the second indication indicates that UE capabilities associated with the UE capability ID are available in the AMF node 130, and when the UE capabilities associated with the UE Capability ID is not available in the network node 110 is adapted to be performed as a response to a request sent to the network node 110, which request requests the UE capabilities associated with the UE capability ID from the AMG node 130, e.g. by being configured to perform a UE Radio Capability Information retrieval from AMF procedure.

Embodiment 27. The AMF node 130 according to any of the embodiments 23-24, further being configured to:

send to the network node 110, the UE capability ID and not explicit UE capabilities associated with the UE capability ID, when the first indication indicates that the network node 110 has capabilities to store UE capabilities associated with the UE capability ID, e.g. by means of the sending unit in the AMF node 130.

Embodiment 28. The AMF node 130 according to any of the embodiments 23-27, further being configured to:

receive, e.g. by means of the receiving unit in the AMF node 130, from the network node 110, UE capabilities associated with the UE capability ID, when the first indication indicates that the network node 110 has not capabilities to store UE capabilities associated with the UE capability ID, and when the second indication indicates that UE capabilities associated with the UE capability ID are not available in the AMF node 130.

Figure 13:
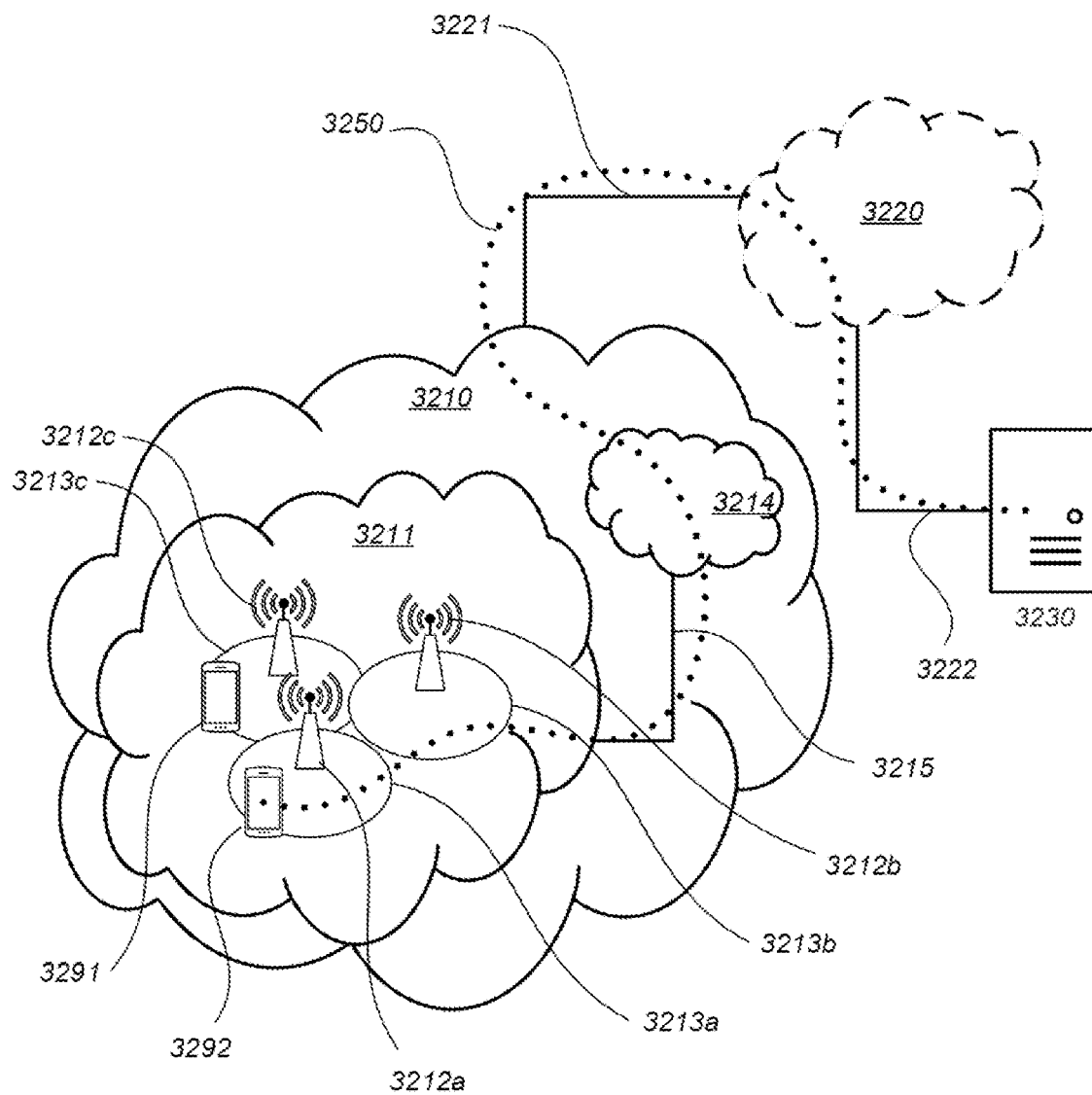
FIG. 13 schematically illustrates a telecommunication network connected via an intermediate network to a host computer.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target network node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230. Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 14 may be identical to the host computer 3230, one of the base stations 3212a, 3212b, 3212c and one of the UEs 3291, 3292 of FIG. 13, respectively. This is to say, the inner workings of these entities may be as shown in FIG. 14 and independently, the surrounding network topology may be that of FIG. 13.

Figure 14:
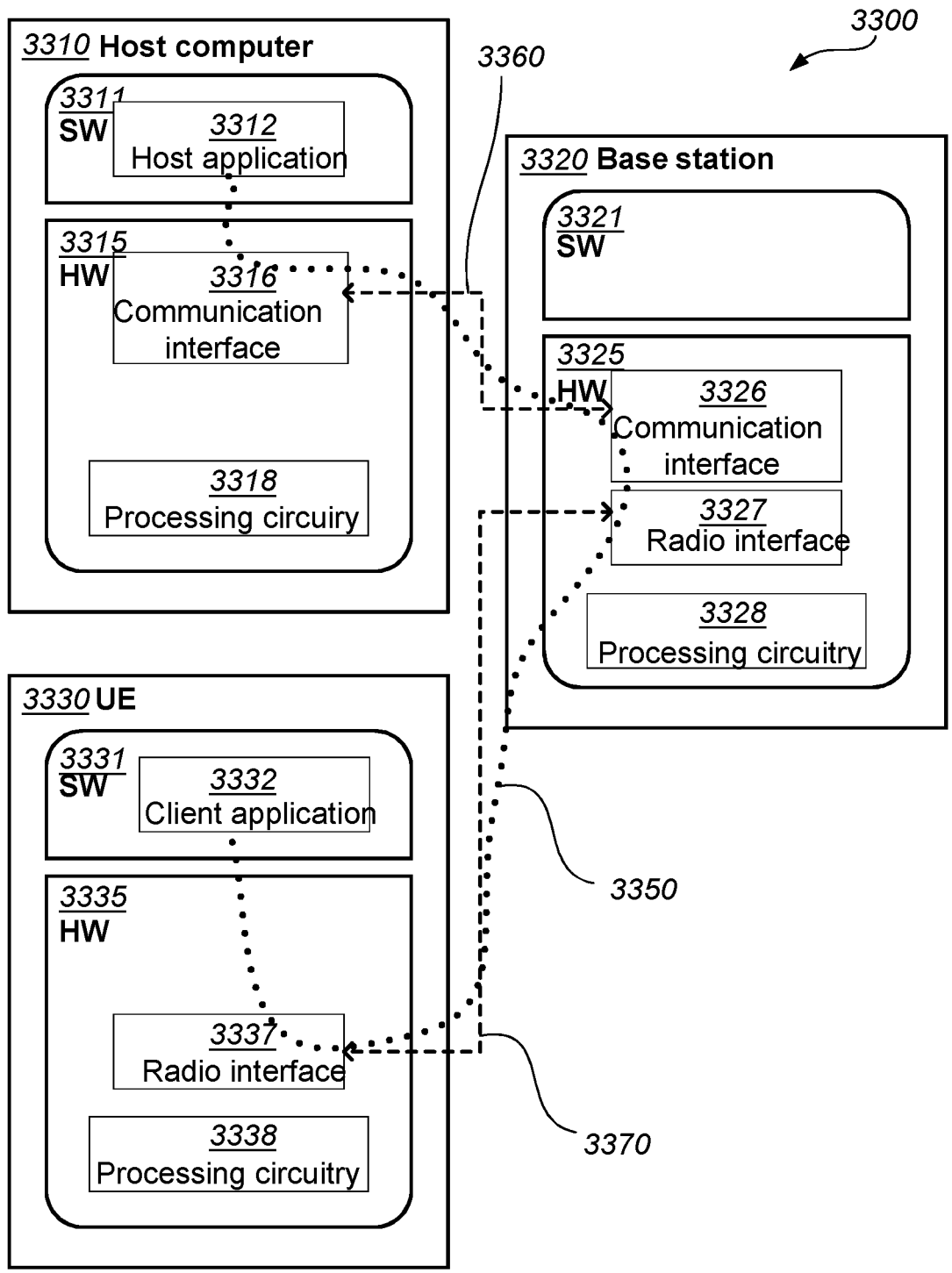
FIG. 14 is a generalized block diagram of a host computer communicating via a base station with a user equipment over a partially wireless connection.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 13 and FIG. 14. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 13 and FIG. 14. For simplicity of the present disclosure, only drawing references to FIG. 16 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 17:
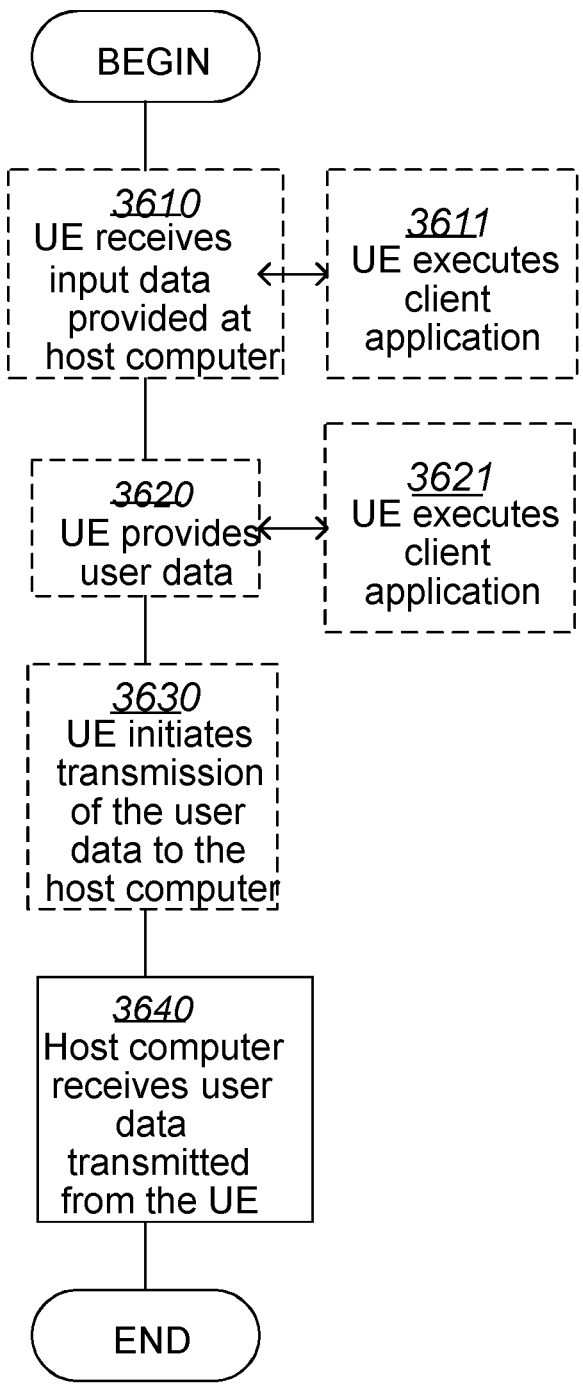

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 13 and FIG. 14. For simplicity of the present disclosure, only drawing references to FIG. 17 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 18:
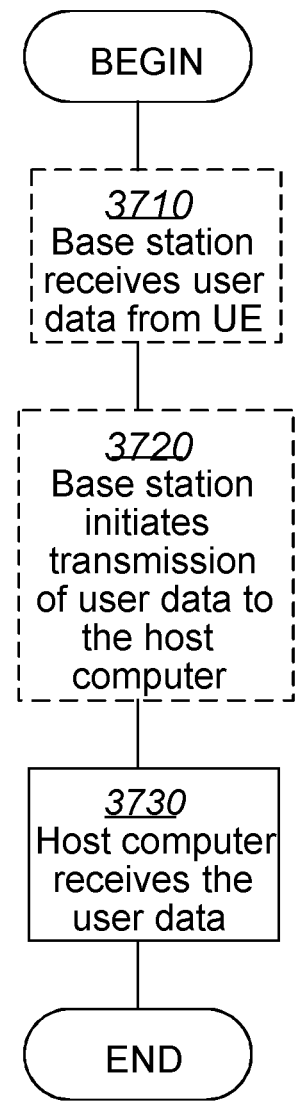

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 18 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node, for handling User Equipment (UE) capabilities of a UE in a wireless communications network, the method comprising:
sending, to an Access and Mobility management Function (AMF) node, a first indication indicating whether or not the network node has capabilities to store UE capabilities associated with a capability identity of the UE (UE capability ID);
receiving, from the AMF node, a second indication indicating whether or not UE capabilities associated with the UE capability ID are available in the AMF node;
deciding whether explicit UE capabilities associated with the UE capability ID shall be retrieved from the UE or the AMF node based on the received second indication; and
receiving, from the AMF node, explicit UE capabilities associated with the UE capability ID, according to any one out of:
when the first indication indicates that the network node has not capabilities to store UE capabilities associated with the UE capability ID, and when the second indication indicates that UE capabilities associated with the UE capability ID are available in the AMF node; or
when the first indication indicates that the network node has capabilities to store UE capabilities associated with the UE capability ID, and when the second indication indicates that UE capabilities associated with the UE capability ID are available in the AMF node, and when the UE capabilities associated with the UE Capability ID is not available in the network node.

2. The method of claim 1, wherein deciding whether explicit UE capabilities associated with the UE capability ID shall be retrieved from the UE or the AMF node is based further on the sent first indication.

3. The method of claim 1, wherein receiving, from the AMF node, explicit UE capabilities associated with the UE capability ID, when the second indication indicates that UE capabilities associated with the UE capability ID are available in the AMF node and when the UE capabilities associated with the UE Capability ID is not available in the network node, is performed upon receiving a request for the UE capabilities associated with the UE capability ID from the AMF node.

4. The method of claim 1, further comprising:
receiving from the UE, explicit UE capabilities associated with the UE capability ID, according to any one out of:
when the first indication indicates that the network node has not capabilities to store UE capabilities associated with the UE capability ID, and when the second indication indicates that UE capabilities associated with the UE capability ID is not available in the AMF node, or
when the first indication indicates that the network node has capabilities to store UE capabilities associated with the UE capability ID, and when the second indication indicates that UE capabilities associated with the UE capability ID is not available in the AMF node, and when the UE Capability ID is not available in the network node.

5. The method of claim 1, further comprising:
receiving from the UE, explicit UE capabilities associated with a UE capability Enquiry according to any one out of:
when the first indication indicates that the network node has not capabilities to store UE capabilities associated with the UE capability ID, and when the second indication indicates that UE capabilities associated with the UE capability ID is not available in the AMF node, or
when the first indication indicates that the network node has capabilities to store UE capabilities associated with the UE capability ID, and when the second indication indicates that UE capabilities associated with the UE capability ID is not available in the AMF node, and when the UE Capability ID is not available in the network node.

6. A method performed by an Access and Mobility management Function (AMF) node for handling User Equipment (UE) capabilities of a UE in a wireless communications network, the method comprising:
- receiving, from a UE, a capability identity of the UE (UE capability ID);
- receiving, from a network node, a first indication indicating whether or not the network node has capabilities to store UE capabilities associated with the UE capability ID;
- checking whether or not UE capabilities associated with the UE capability ID, are available in the AMF node;
- sending, to a network node serving the UE, a second indication indicating whether or not UE capabilities associated with the UE capability ID are available in the AMF node, according to the checking; and
- sending to the network node, explicit UE capabilities associated with any one out of the UE capability ID or a UE capability, according to any one out of:
  - when the first indication indicates that the network node has not capabilities to store UE capabilities associated with the UE capability ID, and when the second indication indicates that UE capabilities associated with the UE capability ID are available in the AMF node; or
  - when the first indication indicates that the network node has capabilities to store UE capabilities associated with the UE capability ID, and when the second indication indicates that UE capabilities associated with the UE capability ID are available in the AMF node, and when the UE capabilities associated with the UE Capability ID is not available in the network node.

7. The method of claim 6, wherein sending, to the network node, explicit UE capabilities associated with the UE capability ID, when the second indication indicates that UE capabilities associated with the UE capability ID are available in the AMF node and when the UE capabilities associated with the UE Capability ID is not available in the network node, is performed as a response to a request sent to the network node, which request requests the UE capabilities associated with the UE capability ID from the AMF node.

8. The method of claim 6, further comprising:
- sending to the network node, the UE capability ID and not explicit UE capabilities associated with the UE capability ID, when the first indication indicates that the network node has capabilities to store UE capabilities associated with the UE capability ID.

9. The method of claim 6, further comprising:
- receiving from the network node, UE capabilities associated with the UE capability ID, when the first indication indicates that the network node has not capabilities to store UE capabilities associated with the UE capability ID, and when the second indication indicates that UE capabilities associated with the UE capability ID are not available in the AMF node.

10. A network node for handling User Equipment (UE) capabilities of a UE in a wireless communications network, the network node comprising:
- input/output interface circuitry configured to communicate with one or more network nodes of the wireless communications network; and
- processing circuitry operatively coupled to the input/output interface circuitry and configured to:
  - send, to an Access and Mobility management Function (AMF) node, a first indication adapted to indicate whether or not the network node has capabilities to store UE capabilities associated with the UE capability ID;
  - receive, from the AMF node, a second indication adapted to indicate whether or not UE capabilities associated with a capability identity of the UE, UE capability ID, are available in the AMF node;
  - decide whether explicit UE capabilities associated with the UE capability ID shall be retrieved from the UE or the AMF node based on the received second indication, which UE capabilities; and
  - receive, from the AMF node, explicit UE capabilities associated with the UE capability ID, according to any one out of:
    - when the first indication indicates that the network node has not capabilities to store UE capabilities associated with the UE capability ID, and when the second indication indicates that UE capabilities associated with the UE capability ID are available in the AMF node; or
    - when the first indication indicates that the network node has capabilities to store UE capabilities associated with the UE capability ID, and when the second indication indicates that UE capabilities associated with the UE capability ID are available in the AMF node, and when the UE capabilities associated with the UE Capability ID is not available in the network node.

11. The network node of claim 10, wherein the decision whether explicit UE capabilities associated with the UE capability ID shall be retrieved from the UE or the AMF node is based further on the sent first indication.

12. The network node of claim 10, wherein the processing circuitry is configured such that the receiving, from the AMF node, explicit UE capabilities associated with the UE capability ID, when the second indication indicates that UE capabilities associated with the UE capability ID are available in the AMF node and when the UE capabilities associated with the UE Capability ID is not available in the network node, is performed upon receiving a request for the UE capabilities associated with the UE capability ID from the AMF node.

13. The network node of claim 10, wherein the processing circuitry is further configured to:
- receive from the UE, explicit UE capabilities associated with the UE capability ID, according to any one out of:
  - when the first indication indicates that the network node has not capabilities to store UE capabilities associated with the UE capability ID, and when the second indication indicates that UE capabilities associated with the UE capability ID is not available in the AMF node, or
  - when the first indication indicates that the network node has capabilities to store UE capabilities associated with the UE capability ID, and when the second indication indicates that UE capabilities associated with the UE capability ID is not available in the AMF node, and when the UE Capability ID is not available in the network node.

14. The network node of claim 10, wherein the processing circuitry is further configured to:
- receive from the UE, explicit UE capabilities associated with a UE capability Enquiry according to any one out of:
  - when the first indication indicates that the network node has not capabilities to store UE capabilities associated with the UE capability ID, and when the second indication indicates that UE capabilities associated with the UE capability ID is not available in the AMF node, or when the first indication indicates that the network node has capabilities to store UE capabilities associated with the UE capability ID, and when the second indication indicates that UE capabilities associated with the UE capability ID is not available in the AMF node, and when the UE Capability ID is not available in the network node.

15. An Access and Mobility management Function (AMF) node for handling User Equipment (UE) capabilities of a UE in a wireless communications network, the AMF node comprising:

input/output interface circuitry configured to communicate with one or more network nodes of the wireless communications network; and processing circuitry operatively coupled to the input/output interface circuitry and configured to:

receive from a UE, a capability identity of the UE (UE capability ID);

receive from a network node, a first indication indicating whether or not the network node has capabilities to store UE capabilities associated with the UE capability ID;

check whether or not UE capabilities associated with the UE capability ID, are available in the AMF node;

send to a network node serving the UE, a second indication adapted to indicate whether or not UE capabilities associated with the UE capability ID are available in the AMF node, according to the checking; and send to the network node, explicit UE capabilities associated with any one out of: the UE capability ID or a UE capability Enquiry, according to any one out of:

when the first indication indicates that the network node has not capabilities to store UE capabilities associated with the UE capability ID, and when the second indication indicates that UE capabilities associated with the UE capability ID are available in the AMF node; or when the first indication indicates that the network node has capabilities to store UE capabilities associated with the UE capability ID, and when the second indication indicates that UE capabilities associated with the UE capability ID are available in the AMF node, and when the UE capabilities associated with the UE Capability ID is not available in the network node.

16. The AMF node of claim 15, wherein the processing circuitry is further configured to:

send to the network node, the UE capability ID and not explicit UE capabilities associated with the UE capability ID, when the first indication indicates that the network node has capabilities to store UE capabilities associated with the UE capability ID.

* * * * *